US011436431B2

(12) United States Patent
Kubota et al.

(10) Patent No.: US 11,436,431 B2
(45) Date of Patent: Sep. 6, 2022

(54) ANALYSIS APPARATUS, NON-TRANSITORY COMPUTER-READABLE STORAGE MEDIUM FOR ANALYSIS PROGRAM, AND ANALYSIS METHOD

(71) Applicant: FUJITSU LIMITED, Kawasaki (JP)

(72) Inventors: Tomonori Kubota, Kawasaki (JP); Takanori Nakao, Kawasaki (JP); Yasuyuki Murata, Shizuoka (JP)

(73) Assignee: FUJITSU LIMITED, Kawasaki (JP)

( * ) Notice: Subject to any disclaimer, the term of this patent is extended or adjusted under 35 U.S.C. 154(b) by 92 days.

(21) Appl. No.: 17/037,798

(22) Filed: Sep. 30, 2020

(65) Prior Publication Data
US 2021/0133484 A1 May 6, 2021

(30) Foreign Application Priority Data
Nov. 5, 2019 (JP) .............................. JP2019-200864

(51) Int. Cl.
G06K 9/62 (2022.01)
G06N 3/08 (2006.01)

(52) U.S. Cl.
CPC ........... *G06K 9/623* (2013.01); *G06K 9/6256* (2013.01); *G06K 9/6298* (2013.01); *G06N 3/084* (2013.01)

(58) Field of Classification Search
CPC .... G06V 10/40; G06V 10/443; G06T 7/0012; G06T 2207/10116
See application file for complete search history.

(56) References Cited

U.S. PATENT DOCUMENTS 7,348,717 B2 * 3/2008 Wei ...................... H01J 31/123
313/309
7,834,305 B2 * 11/2010 Hagio .................... G01S 17/36
250/221

(Continued)

FOREIGN PATENT DOCUMENTS

JP 2009-086926 A 4/2009
JP 2009-211490 A 9/2009

(Continued)

OTHER PUBLICATIONS

Ramprasaath R. Selvaraju, et al., Grad-CAM: Visual Explanations from Deep Networks via Gradient-based Localization, IEEE International Conference on Computer Vision (ICCV), pp. 618-626, arXiv:1610.02391v3 [cs.CV] Mar. 21, 2017 (Total 24 pages).

*Primary Examiner* — Yosef Kassa
(74) *Attorney, Agent, or Firm* — Fujitsu Patent Center

(57) ABSTRACT

A method includes: generating a refine image having a maximized correct label score of inference from an incorrect image by which an incorrect label is inferred by a neural network; generating a third map by superimposing a first map and a second map, the first map indicating pixels to each of which a change is made in generating the refine image, of plural pixels of the incorrect image, the second map indicating a degree of attention for each local region in the refine image, the each local region being a region that has drawn attention at the time of inference by the neural network, and the third map indicating a degree of importance for each pixel for inferring a correct label; and specifying an image section based on a pixel value of the third map, the image section corresponding to a region causing incorrect inference in the incorrect image.

13 Claims, 18 Drawing Sheets

(56) References Cited

U.S. PATENT DOCUMENTS

| | | | | |
|---|---|---|---|---|
| 8,072,450 | B2 * | 12/2011 | Chang | G06T 7/0004 |
| | | | | 702/155 |
| 8,447,074 | B2 * | 5/2013 | Nakamura | G06T 7/571 |
| | | | | 348/229.1 |
| 8,571,325 | B1 * | 10/2013 | Robinson | G06V 20/13 |
| | | | | 382/103 |
| 8,718,383 | B2 * | 5/2014 | Valencia-Campo | |
| | | | | G06K 9/6229 |
| | | | | 382/218 |
| 8,768,024 | B1 * | 7/2014 | Zingman | A61B 1/00009 |
| | | | | 348/45 |
| 9,324,145 | B1 * | 4/2016 | Cherevatsky | A61B 34/20 |

FOREIGN PATENT DOCUMENTS

| | | |
|---|---|---|
| JP | 2013-114596 A | 6/2013 |
| JP | 2018-032078 A | 3/2018 |
| JP | 2018-045350 A | 3/2018 |
| JP | 2018-097807 A | 6/2018 |

\* cited by examiner

大专栏  ANALYSIS APPARATUS, NON-TRANSITORY COMPUTER-READABLE STORAGE MEDIUM FOR ANALYSIS PROGRAM, AND ANALYSIS METHOD

CROSS-REFERENCE TO RELATED APPLICATION

This application is based upon and claims the benefit of priority of the prior Japanese Patent Application No. 2019-200864, filed on Nov. 5, 2019, the entire contents of which are incorporated herein by reference.

FIELD

The embodiments discussed herein are related to an analysis apparatus, a non-transitory computer-readable storage medium storing an analysis program, and an analysis method.

BACKGROUND

In recent years, analysis techniques have been proposed that analyze a cause of incorrect inference when an incorrect label is inferred in an image recognition process using a convolutional neural network (CNN). Such techniques include the activation maximization method. There are proposed the analysis techniques for analyzing an image section that draws attention at the time of inference in the image recognition process. Such techniques include a back propagation (BP) method and a guided back propagation (GBP) method.

The activation maximization method is a method of specifying, as an image section that causes incorrect inference, a changed portion when an input image is changed so that a correct label of inference has a maximum score. The BP method or the GBP method is a method of visualizing a feature portion that responds at the time of inference, by back propagating from an inferred label and tracing to an input image.

Examples of the related art include Japanese Laid-open Patent Publication Nos. 2018-097807 and 2018-045350.

Examples of the related art also include Ramprasaath R. Selvaraju, et al.: Grad-cam: Visual explanations from deep networks via gradient-based localization. The IEEE International Conference on Computer Vision (ICCV), pp. 618-626, 2017.

SUMMARY

According to an aspect of the embodiments, provided is an analysis apparatus comprising: a memory configured to program instructions; and a processor coupled to the memory, the processor being configured to perform program instructions stored in the memory, the program instructions including; executing an image generating processing configured to generate a refine image having a maximized correct label score of inference from an incorrect inference image from which an incorrect label is inferred by a neural network; executing a map generating processing configured to generate a third map by superimposing a first map and a second map, the first map indicating pixels to each of which a change is made in generating the refine image, of a plurality of pixels of the incorrect inference image, the second map indicating a degree of attention for each local region in the refine image, the each local region being a region that has drawn attention at the time of inference by the neural network, and the third map indicating a degree of importance for each pixel for inferring a correct label; and executing a specifying processing configured to specify an image section based on a pixel value of the third map, the image section corresponding to a region causing incorrect inference in the incorrect inference image, wherein the generating of the refine image is configured to generate the refine image from the incorrect inference image by using information that is calculated at the time of inference and is related to an inference target included in the incorrect inference image.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

Figure 1:
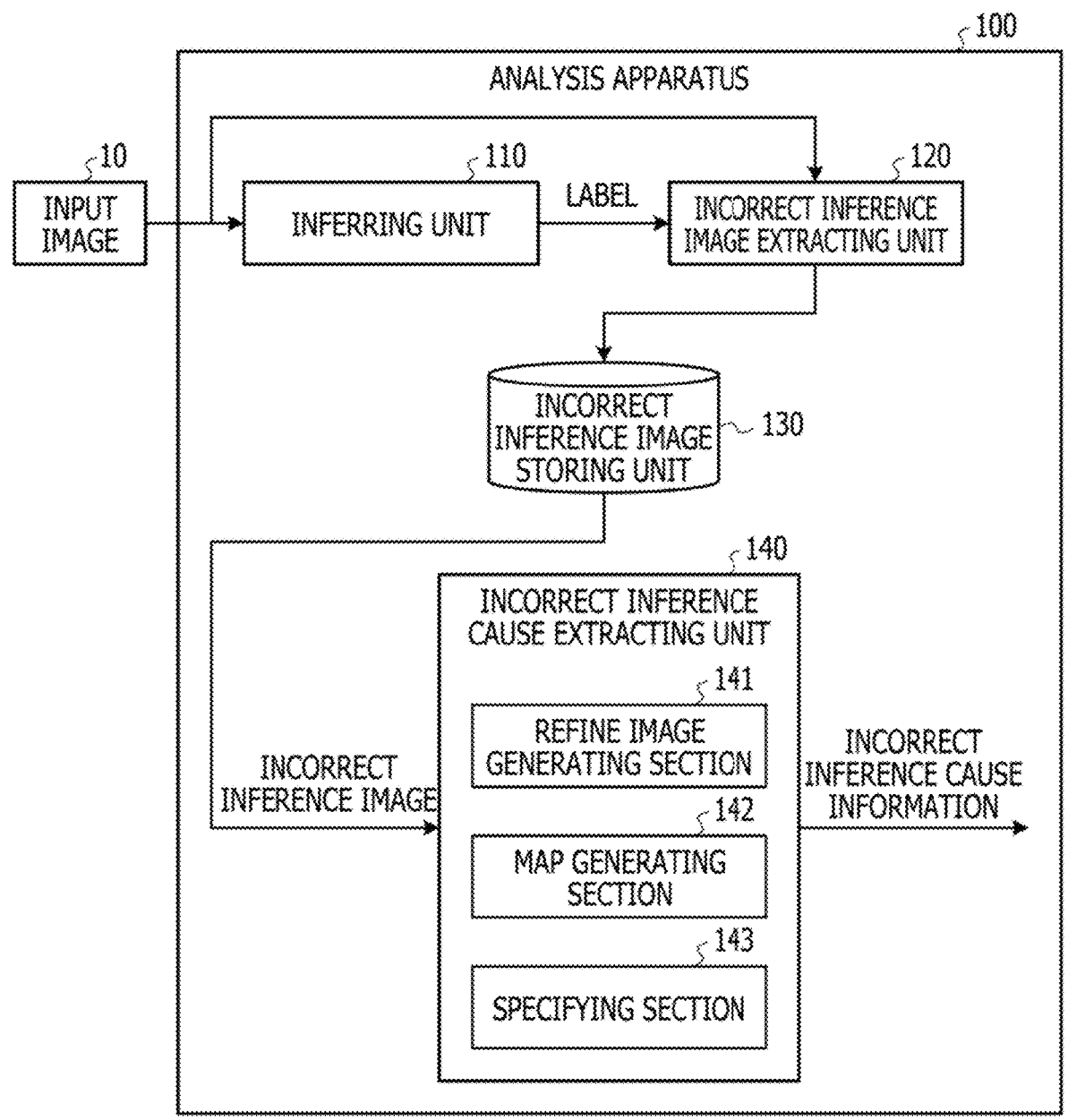
FIG. 1 is a diagram illustrating an example of a functional configuration of an analysis apparatus.

There is, however, a problem that any of the above-described analysis techniques may not specify an image section that causes incorrect inference, with adequately high precision.

In an aspect of the embodiments, provided is a solution to improve precision in specifying an image section that causes incorrect inference.

Hereinafter, embodiments are described with reference to the accompanying drawings. In the present specification and drawings, components having substantially same functional configurations are assigned with same reference numerals, and overlapping description is omitted.

First Embodiment

<Functional Configuration of Analysis Apparatus>

First, a functional configuration of an analysis apparatus according to a first embodiment is described. FIG. 1 illustrates an example of the functional configuration of the analysis apparatus. In an analysis apparatus 100, analysis programs are installed, and execution of the programs causes the analysis apparatus 100 to function as an inferring unit 110, an incorrect inference image extracting unit 120, and an incorrect inference cause extracting unit 140.

The inferring unit 110 performs an image recognition process using a pre-trained CNN. For example, upon input of an input image 10, the inferring unit 110 infers a label indicating a type of an object (inference target) included in the input image 10 (a type of a vehicle in the present embodiment) and outputs the inferred label.

The incorrect inference image extracting unit 120 determines whether or not the label (correct label) indicating the type of the object included in the input image 10 and the label inferred by the inferring unit 110 match. The incorrect inference image extracting unit 120 extracts the input image that is determined not to match (for which an incorrect label is inferred) as an "incorrect inference image" and stores the image in an incorrect inference image storing unit 130.

Alternatively, the incorrect inference image extracting unit 120 determines whether a correct position of the object included in the input image 10 matches a position of an object inferred by the inferring unit 110. The incorrect inference image extracting unit 120 extracts, as the "incorrect inference image", an input image in which a correct position of an object is determined to be off the position of the inferred object, or an input image in which a position of an object is not inferred, in the incorrect inference image storing unit 130. The correct position of the object may be added to the input image 10 as teacher information or may be acquired by inference in a state in which correct inference is possible. Alternatively, the correct position of the object may be specified by using other means.

The incorrect inference cause extracting unit 140 specifies an image section that causes incorrect inference from an incorrect inference image and outputs incorrect inference cause information. Specifically, for example, the incorrect inference cause extracting unit 140 includes a refine image generating section 141, a map generating section 142, and a specifying section 143.

The refine image generating section 141 is an example of the image generating section. The refine image generating section 141 reads the incorrect inference image stored in the incorrect inference image storing unit 130. The refine image generating section 141 generates a score-maximized refine image having a maximized correct label score of inference, from the read incorrect inference image.

The map generating section 142 generates a map for indicating a degree of importance of each pixel for inferring a correct label, using known analysis techniques and the like that analyze the cause of incorrect inference.

The specifying section 143 segments the incorrect inference image into a plurality of regions, and replaces, with the generated score-maximized refine image, a region that is defined based on the generated map of the segmented plurality of regions. The specifying section 143 infers a label by inputting the incorrect inference image in which the region has been replaced with the score-maximized refine image, and determines the effect of the replacement from the score of the inferred label.

The specifying section 143 infers a label while updating the region, and specifies from a score of the inferred label, the image section that causes incorrect inference, in the unit of a region. The specifying section 143 outputs, as incorrect inference cause information, the incorrect-inference-causing image section that is specified in the unit of a region.

In this manner, according to the incorrect inference cause extracting unit 140, it is possible to specify an image section that causes incorrect inference with precision, by generating a map that indicates the degree of importance of each pixel for inferring a correct label using known analysis techniques, replacing a region defined based on the generated map with a score-maximized refine image, and specifying the image section that causes incorrect inference while referring to the effect of the replacement.

<Hardware Configuration of Analysis Apparatus>

Figure 2:
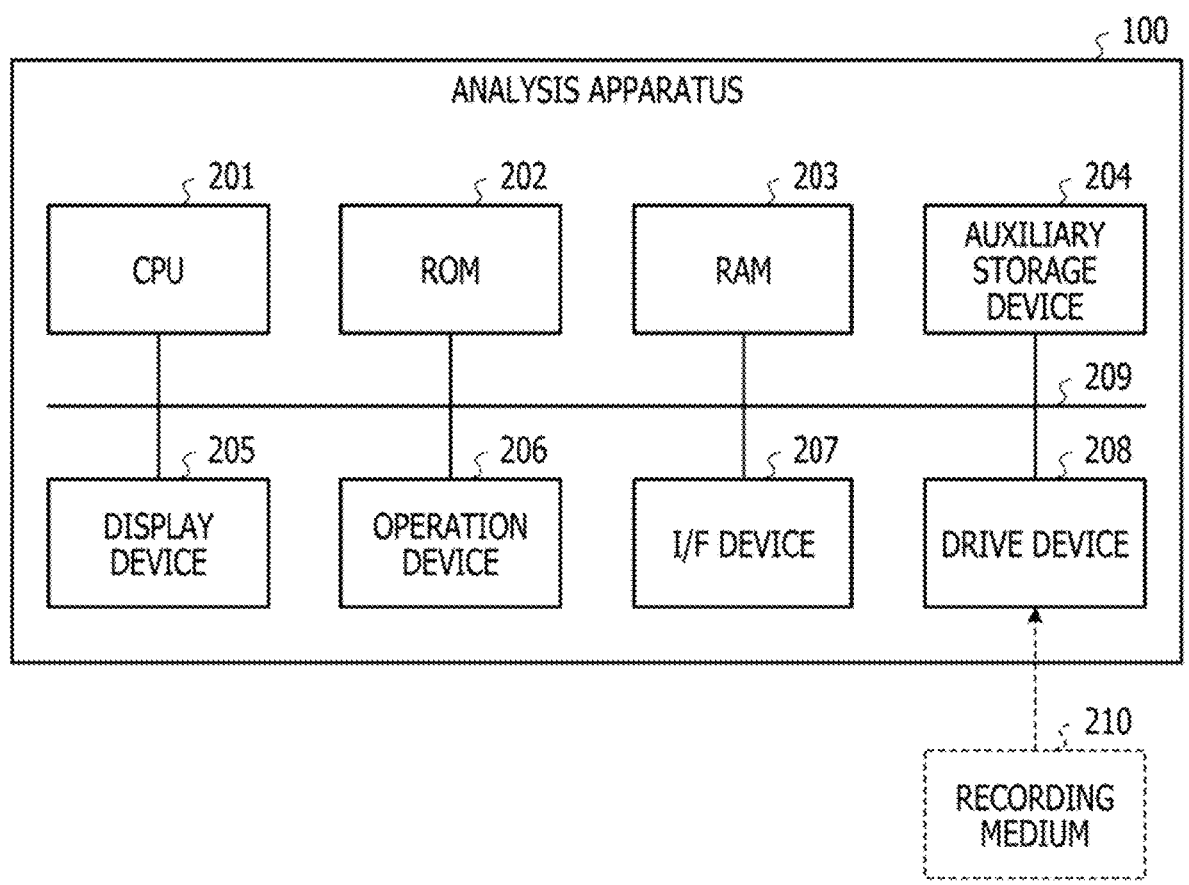
FIG. 2 is a diagram illustrating an example of a hardware configuration of the analysis apparatus.

Next, a hardware configuration of the analysis apparatus 100 is described. FIG. 2 illustrates an example of the hardware configuration of the analysis apparatus. As illustrated in FIG. 2, the analysis apparatus 100 includes a central processing unit (CPU) 201, a read-only memory (ROM) 202, and a random-access memory (RAM) 203. The CPU 201, the ROM 202, and the RAM 203 form a so-called computer.

The analysis apparatus 100 includes an auxiliary storage device 204, a display device 205, an operation device 206, an interface (I/F) device 207, and a drive device 208. The hardware components of the analysis apparatus 100 are coupled to each other via a bus 209.

The CPU 201 is a calculating device that runs various programs (for example, an analysis program and the like) installed in the auxiliary storage device 204. Although not illustrated in FIG. 2, an accelerator (for example, a graphics processing unit (GPU)) may be combined as a calculating device.

The ROM 202 is a non-volatile memory. The ROM 202 functions as a main storage device that stores various programs, data, and the like for the CPU 201 to execute the various programs installed in the auxiliary storage device 204. For example, the ROM 202 functions as a main storage device that stores a boot program such as a Basic Input/Output System (BIOS) and an Extensible Firmware Interface (EFI).

The RAM 203 is a volatile memory such as a dynamic random-access memory (DRAM) or a static random-access memory (SRAM). The RAM 203 functions as the main storage device that provides a work area where the various programs installed in the auxiliary storage device 204 are expanded for execution by the CPU 201.

The auxiliary storage device 204 is an auxiliary storage device which stores the various programs and information to be used for execution of the various programs. For example, the incorrect inference image storing unit 130 is implemented by the auxiliary storage device 204.

The display device 205 is a display device that displays various display screens including the incorrect inference cause information and the like. The operation device 206 is an input device to be used by a user of the analysis apparatus 100 to input various instructions to the analysis apparatus 100.

The I/F device 207 is, for example, a communication device to be coupled with a network not illustrated.

The drive device 208 is a device in which a recording medium 210 is set. The recording media 210 discussed herein include media that record information optically, electrically, and magnetically like a CD-ROM, a flexible disk, a magneto-optical disk, and the like. The recording media 210 may also include a semiconductor memory and so on, such as a ROM and a flash memory, which record information electrically.

The various programs installed in the auxiliary storage device 204 are installed, for example, in such a way that the distributed recording medium 210 is set in the drive device 208, and the various programs recorded in the recording medium 210 are read by the drive device 208. Alternatively, the various programs installed in the auxiliary storage device 204 may be installed by being downloaded from a network that is not illustrated.

<Functional Configuration of Incorrect Inference Cause Extracting Unit>

Figure 3:
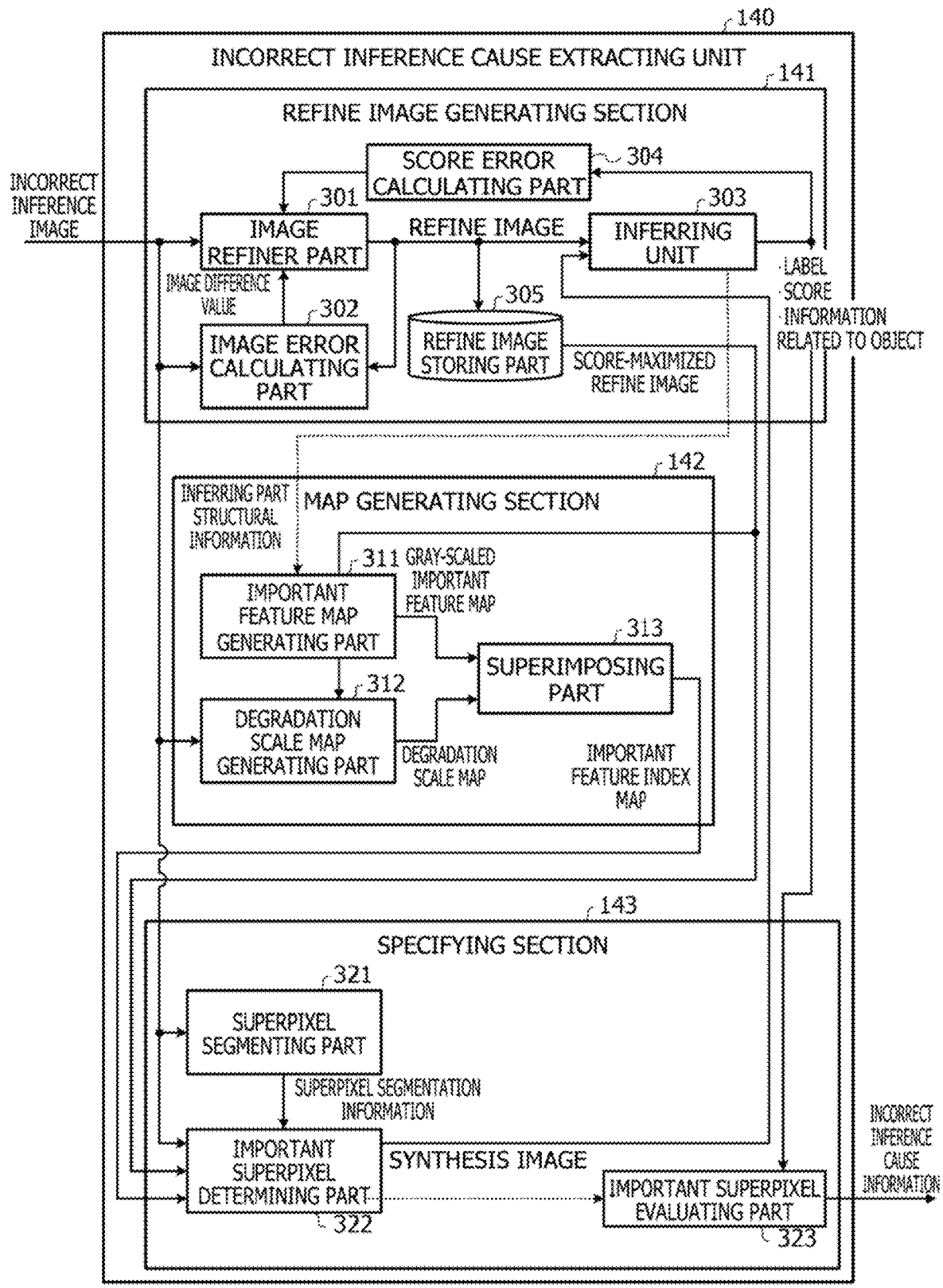
FIG. 3 illustrates an example of a functional configuration of an incorrect inference cause extracting unit.

Next, a functional configuration of the incorrect inference cause extracting unit 140 is described in detail among the functions implemented in the analysis apparatus 100 according to the first embodiment. FIG. 3 illustrates an example of a functional configuration of an incorrect inference cause extracting unit. Hereinafter, the components (the refine image generating section 141, the map generating section 142, and the specifying section 143) of the incorrect inference cause extracting unit 140 are described in detail.

(1) Details of Refine Image Generating Section

First, the refine image generating section 141 is described in detail. As illustrated in FIG. 3, the refine image generating section 141 includes an image refiner part 301, an image error calculating part 302, the inferring part 303, and an error calculating part 304.

The image refiner part 301 generates a refine image from the incorrect inference image using the CNN as an image generation model, for example.

When making inference using the generated refine image, the image refiner part 301 changes the incorrect inference image such that the correct label score is maximized. When generating the refine image using the image generation model, the image refiner part 301 generates the refine image so that, for example, information related to the object included in the incorrect inference image is close to the correct information related to the object (inference target). When generating the refine image using the image generation model, the image refiner part 301 generates the refine image so that, for example, an amount of change from the incorrect inference image (difference between the refine image and the incorrect inference image) is small.

For example, the image refiner part 301 performs CNN training so as to minimize a score error that is an error between the score when making inference using the generated refine image and the maximized correct label score, an object error between information related to the object (inference target) when inferring the label using the generated refine image and the correct information related to the object of the correct label, and an image difference value that is a difference between the generated refine image and the incorrect inference image (for example, an image difference (L1 difference) or structural similarity (SSIM), or a combination of the L1 difference and the structural similarity).

The image error calculating part 302 calculates a difference between the incorrect inference image and the refine image outputted from the image refiner part 301 during the CNN training process and inputs the image difference value to the image refiner part 301. The image error calculating part 302 calculates the image difference value by performing difference (L1 difference) calculation for each pixel or structural similarity (SSIM) calculation, for example, and inputs the image difference value to the image refiner part 301.

The inferring part 303 performs the image recognition process by using the trained CNN. The inferring part 303 includes the trained CNN that infers a label by inputting the refine image (or the score-maximized refine image) generated by the image refiner part 301 or a synthesis image generated by the important superpixel determining part 322, and calculates a score. The synthesis image mentioned herein shall refer to the incorrect inference image a region of which is replaced with the score-maximized refine image, the region being defined based on a map (important feature index map) generated by the map generating section 142.

When inputting the refine image to infer the label, the inferring part 303 calculates information related to an object in the refine image and notifies the error calculating part 304 of the information, together with the score.

When inputting the synthesis image to infer the label, the inferring part 303 adds the score to the important superpixel evaluating part 323.

The error calculating part 304 calculates the score error that is an error between the score notified by the inferring part 303 and the maximized correct label score, and notifies the score error to the image refiner part 301. The error calculating part 304 calculates the object error that is an error between the information related to the object notified by the inferring part 303 and the correct information related to the object of the correct label, and notifies the object error to the image refiner part 301.

In the image refiner part 301, the score error and the object error notified by the error calculating part 304 are used in the CNN learning process (may be referred to as the CNN training process) together with the image difference value notified by the image error calculating part 302.

In this manner, use of the object error in the CNN learning process (i.e., the CNN training process) allows the image refiner part 301 to appropriately generate the score-maximized refine image.

The refine image outputted from the image refiner part 301 during the training of the CNN included in the image refiner part 301 is stored in a refine image storing part 305. The training of the CNN included in the image refiner part 301 is performed, •for a predetermined number of training iterations (for example, the maximum number of training iterations=N times), or•until the correct label score exceeds a predetermined threshold, or•until the correct label score exceeds the predetermined threshold and the image difference value falls below the predetermined threshold, or until the object error falls below a predetermined threshold. As such, the score-maximized refine image is stored in the refine image storing part 305, the score-maximized refine image being a refine image of when the correct label score outputted by the inferring part 303 is maximized.

(2) Details of Map Generating Section

Next, the map generating section 142 is described in detail. As illustrated in FIG. 3, the map generating section 142 includes an important feature map generating part 311, a degradation scale map generating part 312, and a superimposing part 313.

The important feature map generating part 311 acquires, from the inferring part 303, inferring part structural information when the score-maximized refine image is inputted and the label is inferred. The important feature map generating part 311 generates a "gray-scaled important feature map" based on the inferring part structural information using known algorithms. The examples of the known algorithms include, but are not limited to, the back propagation (BP) method, the guided back propagation (GBP) method, or a selective BP method. The gray-scaled important feature map is an example of a second map, and is a map gray-scaled to indicate a degree of attention of each of pixels that has drawn attention at the time of inference, of a plurality of the pixels in the score-maximized refine image. It is noted that the size of the second map may be different from the size of the score-maximized refine image.

The BP method is a method of visualizing a feature portion, by calculating an error of each label from each score that is obtained by making inference of an input image whose inferred label is correct (here, the score-maximized refine image) and imaging the magnitude of gradient information that is obtained by back-propagating to an input layer. The GBP method is a method of visualizing a feature portion by imaging only a positive value of the magnitude of the gradient information.

The selective BP method is a method that maximizes only an error of a correct label and then performs processing using the BP method or the GBP method. In the case of the selective BP method, only a feature portion that affects the correct label score is visualized.

The degradation scale map generating part 312 generates a "degradation scale map", which is an example of the first map, based on an incorrect inference image and a score-maximized refine image. The degradation scale map indicates a degree of change of each pixel that is changed when the score-maximized refine image is generated.

The superimposing part 313 generates an "important feature index map", which is an example of the third map, by superimposing the gray-scaled important feature map generated by the important feature map generating part 311 and the degradation scale map generated by the degradation scale map generating part 312. The important feature index map indicates a degree of importance of each pixel for inferring a correct label. It is noted that the size of the second map may be different from the size of the first map (e.g., the degradation scale map).

(3) Details of Specifying Section

Next, the specifying section 143 is described in detail. As illustrated in FIG. 3, the specifying section 143 includes a superpixel segmenting part 321, an important superpixel determining part 322, and an important superpixel evaluating part 323.

The superpixel segmenting part 321 segments the incorrect inference image into "superpixels" which are regions of each element object (a vehicle in the present embodiment) of an object included in the incorrect inference image, and outputs superpixel segmentation information. In segmenting the incorrect inference image into the superpixels, an existing segmentation function is utilized, or CNN and the like trained to segment for each component of the vehicle is utilized.

The important superpixel determining part 322 adds up a pixel value of each pixel of the important feature index map generated by the superimposing part 313 for each superpixel, based on the superpixel segmentation information outputted by the superpixel segmenting part 321.

The important superpixel determining part 322 extracts a superpixel having an added value that satisfies a predetermined condition (being larger than or equal to an important feature index threshold) among the superpixels. The important superpixel determining part 322 defines, as a changeable region (a first region to be replaced by the score-maximized refine image), a superpixel group that is a combination of superpixels selected from the extracted superpixels. The important superpixel determining part 322 defines, as an unchangeable region (a second region not to be replaced by the score-maximized refine image), a superpixel group other than the group of combined superpixels.

The important superpixel determining part 322 not only extracts an image section corresponding to the unchangeable region from the incorrect inference image, but also extracts an image section corresponding to the changeable region from the score-maximized refine image, and generates a synthesis image by synthesizing these image sections.

The important superpixel determining part 322 increases the number of superpixels to be extracted (widens the changeable region and narrows the unchangeable region) by gradually lowering the important feature index threshold used in defining the changeable region and the unchangeable region. The important superpixel determining part 322 updates the changeable region and the unchangeable region which are to be defined, while changing the combination of the superpixels to be selected from the extracted superpixels.

The important superpixel evaluating part 323 acquires a correct label score that is inferred every time the synthesis image generated by the important superpixel determining part 322 is inputted to the inferring part 303.

As described above, the important superpixel determining part 322 generates synthesis images the number of which corresponds to the number of times of lowering the important feature index threshold and the number of combinations of superpixels. Consequently, the important superpixel evaluating part 323 acquires the correct label scores the number of which corresponds to the above number.

The important superpixel evaluating part 323 specifies a combination of superpixels (changeable region) that causes incorrect inference based on the acquired scores, and outputs the specified combination as the incorrect inference cause information.

At this time, the important superpixel evaluating part 323 specifies the changeable region so that an area is as small as possible. For example, when evaluating the scores acquired from the inferring part 303, the important superpixel evaluating part 323 preferentially evaluates a superpixel having a small area in ascending order, of superpixels before the important feature index threshold is lowered or combinations of superpixels. The important superpixel evaluating part 323 specifies a changeable region (a changeable region that is extracted with the important feature index threshold at a limit capable of inferring a correct label and has the smallest area) at which time the correct label is inferred as the important feature index threshold is lowered.

Specific Example of Processing of Components of Incorrect Inference Cause Extracting Unit Next, specific examples of processing of the components (the refine image generating section 141, the map generating section 142, and the specifying section 143) of the incorrect inference cause extracting unit 140 are described. In the following, description is given on the assumption that an incorrect inference image includes a plurality of objects (plurality of vehicles) as an inference target.

(1) Specific Example of Processing of Refine Image Generating Section

First, specific examples of the processing of the components (here, the image refiner part 301, the inferring part 303, and the error calculating part 304) of the refine image generating section 141 are described.

(1-1) Specific Example of Processing of Image Refiner Part

Figure 4:
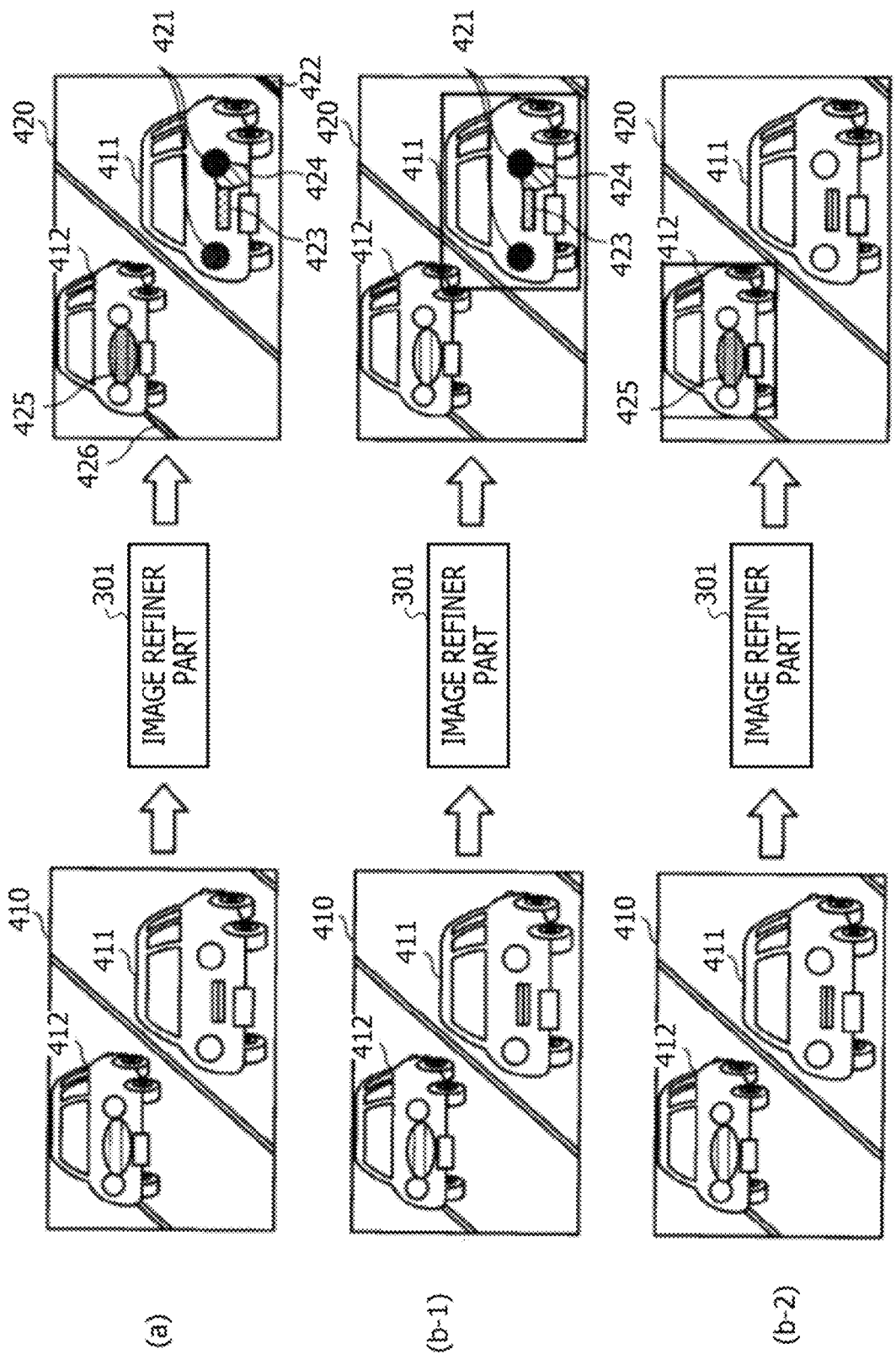
FIG. 4 illustrates specific examples of processing of an image refiner part.

FIG. 4 illustrates the specific examples of the processing of the image refiner part, each example being depicted by section (a), section (b-1) and section (b-2), respectively. As illustrated in FIG. 4, an incorrect inference image 410 is inputted to the image refiner part 301. The image refiner part 301 generates a score-maximized refine image for each of objects (vehicles 411, 412) included in the inputted incorrect inference image 410.

In FIG. 4, the vehicle 411 is a vehicle that is incorrectly inferred as "vehicle B" although the correct label="vehicle model A". The vehicle 412 is a vehicle that is incorrectly inferred as "vehicle model C" although the correct label="vehicle model B".

When generating the score-maximized refine image for the vehicle 411 and the vehicle 412, the image refiner part 301 selectively performs any generation method of two generation methods (first and second generation methods).

A first generation method performed by the image refiner part 301 is a method of generating a score-maximized refine image so that scores of correct labels of all objects included in an incorrect inference image are maximized.

Section (a) in FIG. 4 illustrates a case where the image refiner part 301 generates the score-maximized refine image for the incorrect inference image 410 with the first generation method. The example depicted by the section (a) in FIG. 4 illustrates that one score-maximized refine image 420, which allows for correct inference of the vehicle 411 as "vehicle model A" and vehicle 412 as "vehicle model B", is generated by changing colors of headlights 421 of the vehicle 411, a color of a road sign 422, a color of a front grille 423 of the vehicle 411, and a color of a vehicle body 424 between the front grille 423 and the left headlight 421, and a color of a front grille 425 of the vehicle 412 and a color of a road sign 426.

On the other hand, the second generation method performed by the image refiner part 301 is a method of generating a score-maximized refine image so that a score is maximized for each object included in an incorrect inference image. According to the second generation method, score-maximized refine images the number of which corresponds to the number of the objects included in the incorrect inference image are generated.

Section (b-1) in FIG. 4 illustrates a case where the image refiner part 301 generates the score-maximized refine image for the vehicle 411 included in the incorrect inference image 410 with the second generation method. The example depicted by the section (b-1) in FIG. 4 illustrates that a score-maximized refine image 430, which allows for correct inference of the vehicle 411 as "vehicle model A", is generated by changing the colors of the headlights 421 of the vehicle 411, the color of the front grille 423, and the color of the vehicle body 424 between the front grille 423 and the left headlight 421.

Section (b-2) in FIG. 4 illustrates a case where the image refiner part 301 generates the score-maximized refine image for the vehicle 412 included in the incorrect inference image 410 with the second generation method. The example depicted by the section (b-2) in FIG. 4 illustrates that a score-maximized refine image 440, which allows for correct inference of the vehicle 412 as "vehicle model B", is generated by changing the color of the front grille 425 of the vehicle 412.

(1-2) Specific Example of Processing of Inferring Part

Figure 5:
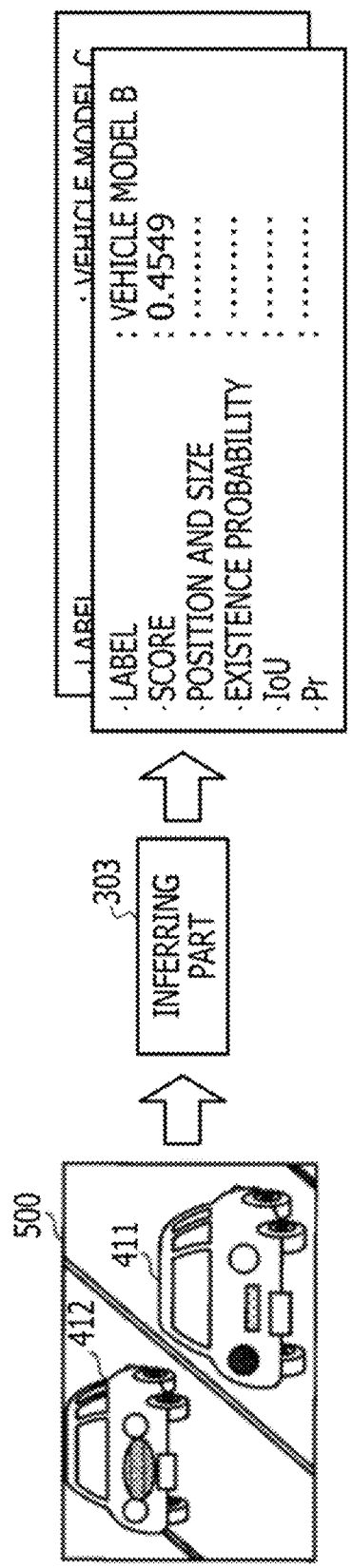
FIG. 5 illustrates a specific example of processing of an inferring part.

FIG. 5 illustrates a specific example of processing of the inferring part. For example, the example of FIG. 5 illustrates a case where the image refiner part 301 inputs to the inferring part 303 a refine image 500 (refine image generated in the process of generating the score-maximized refine image) that is generated with the first generation method.

As illustrated in FIG. 5, the inferring part 303 calculates, as information related to the vehicle 411, "a position and a size", "an existence probability", "IoU", and "Pr", in addition to a label and a score of the vehicle 411. Similarly, the inferring part 303 calculates, as information related to the vehicle 412, "a position and a size", "an existence probability", "IoU", and "Pr", in addition to a label and a score of the vehicle 412.

Hereinafter, the information related to the objects (information related to the vehicles 411 and 412) calculated by the inferring part 303 are described in detail, with reference to FIG. 6 to FIG. 8.

(i) Position and Size

Figure 6:
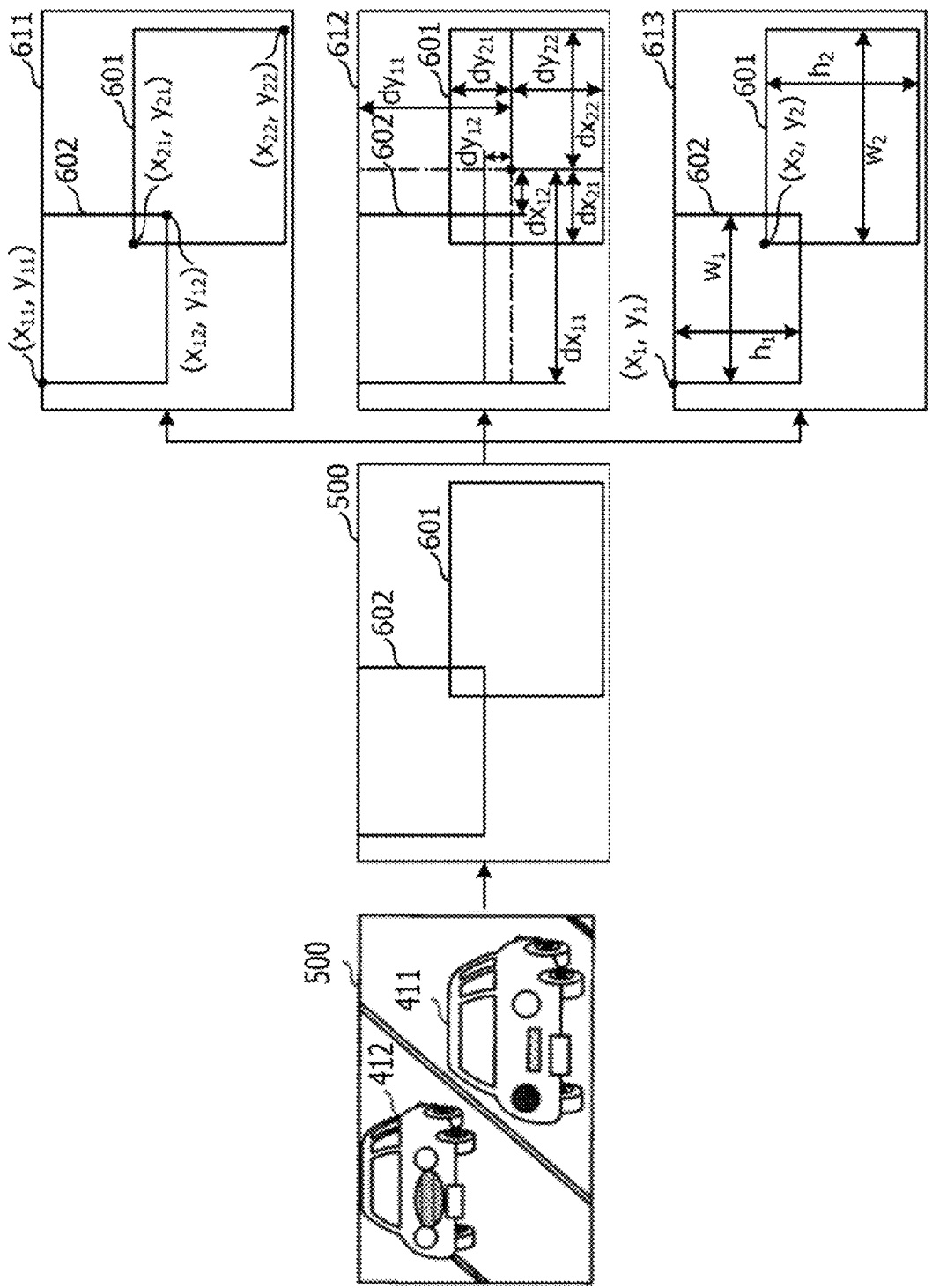
FIG. 6 illustrates an example of a method of calculating a position and a size of an object in a refine image.

FIG. 6 illustrates an example of a method of calculating a position and a size of an object in a refine image. The inferring part 303 calculates a position and a size of an object by specifying bounding rectangles 601 and 602 of the objects (vehicles 411 and 412) included in the refine image 500.

The inferring part 303 has three calculating methods (first to third calculating method) as a method of calculating a position and a size of an object and calculates the position and the size of the object with any of the calculating methods.

The first calculating method that the inferring part 303 has is a method of calculating coordinates of an upper left vertex and coordinates of an lower right vertex of each of the bounding rectangles 601 and 602. According to the first generation method, as denoted by a numeral 611, the first calculating method calculates $(x_{11}, y_{11})$ and $(x_{12}, y_{12})$ as a position and a size of the vehicle 412 and $(x_{21}, y_{21})$ and $(x_{22}, y_{22})$ as a position and a size of the vehicle 411.

On the other hand, the second calculating method that the inferring part 303 has is a method of calculating distance from a certain position to the upper left vertex and distance from the certain position to the lower right vertex of each of the bounding rectangles 601 and 602. According to the second generation method, as denoted by a numeral 612, the second calculating method calculates $dx_{11}$, $dy_{11}$, $dx_{12}$, and $dy_{12}$ as the position and the size of the vehicle 412 and $dx_{21}$, $dy_{21}$, $dx_{22}$, and $dy_{22}$ as the position and the size of the vehicle 411, respectively.

On the other hand, the third calculating method that the inferring part 303 has is a method of calculating the coordinates, a height, and a width of the upper left vertex of each of the bounding rectangles 601 and 602. According to the third generation method, as denoted by a numeral 613, the third calculating method calculates $(x_1, y_1)$ and $h_1$, $w_1$ as the position and the size of the vehicle 412 and $(x_2, y_2)$ and $h_2$, $w_2$ as the position and the size of the vehicle 411.

Although FIG. 6 exemplifies the three calculating methods, the inferring part 303 may calculate a position and a size of an object in the refine image with any calculating method other than the calculating methods illustrated in FIG. 6.

For example, although the second calculating method sets a specific position as a reference, an upper left vertex of a rectangle that serves as a reference may be used as the specific position (fourth calculating method).

Although the third calculating method calculates the coordinates of the upper left vertex of the bounding rectangle, the third calculating method may calculate coordinates of a center position of the bounding rectangle (fifth calculating method).

(ii) Existence Probability

Figure 7:
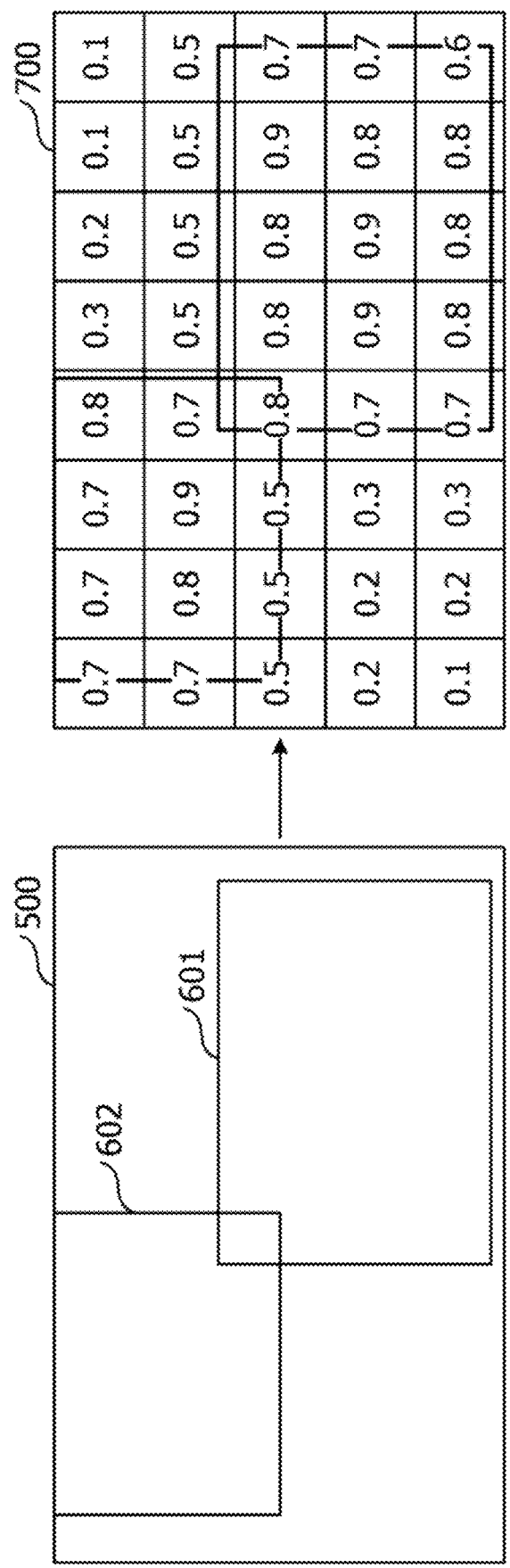
FIG. 7 illustrates an example of an existence probability of the object in the refine image.
Figure 8:
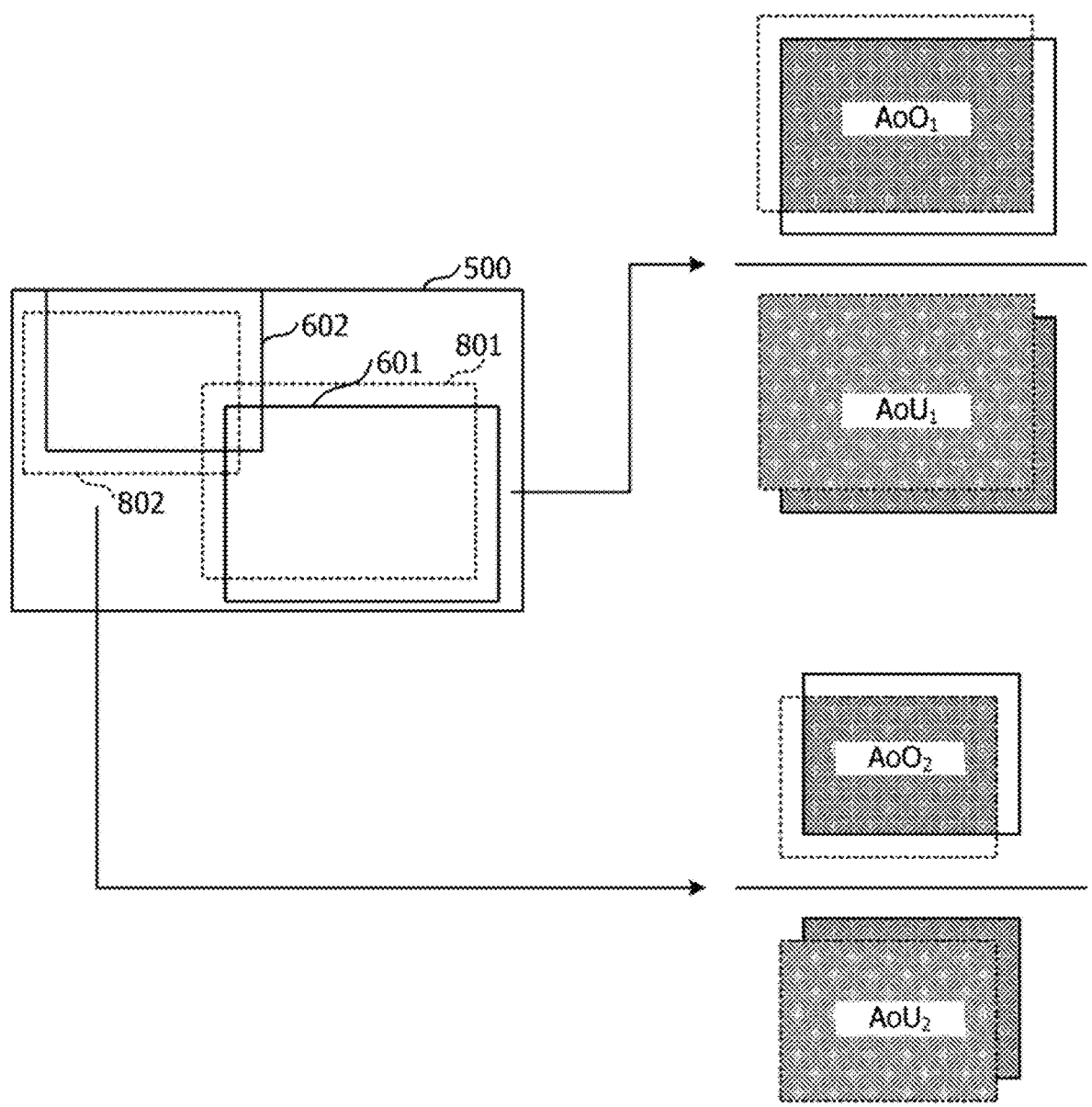
FIG. 8 illustrates an example of a method of calculating intersection over union (IoU) of the object in the refine image.

FIG. 7 illustrates an example of an existence probability of the object in the refine image. The inferring part 303 segments the refine image 500 into a plurality of blocks and calculates a probability that an object exists, for each of the blocks.

In FIG. 7, a numeral 700 depicts a case where the existence probability of the vehicles 411, 412 is calculated, for each of the blocks represented by dashed lines.

(iii) IoU and Pr

Intersection over union (IoU) is an evaluation index that indicates whether it is possible for the inferring part 303 to correctly detect the vehicles 411, 412 in the refine image 500. FIG. 8 illustrates an example of a method of calculating IoU of an object in a refine image. As illustrated in FIG. 8, if a correct bounding rectangle 801 is given to the bounding rectangle 601 of the vehicle 411 inferred by the inferring part 303, it is possible to calculate the IoU of the vehicle 411 with the following equation.

$$\text{IoU of the vehicle } 411 = AoO_1/AoU_1 \qquad \text{(Equation 1)}$$

In the Equation 1, "$AoO_1$" refers to an area of an intersection of the bounding rectangle 601 of the vehicle 411, which is inferred by the inferring part 303, and the correct bounding rectangle 801. "$AoU_1$" refers to an area of a union of the bounding rectangle 601 of the vehicle 411, which is inferred by the inferring part 303, and the correct bounding rectangle 801.

Similarly, if a correct bounding rectangle 802 is given to the bounding rectangle 602 of the vehicle 412 inferred by the inferring part 303, it is possible to calculate the IoU of the vehicle 412 with the following equation.

$$\text{IoU of the vehicle } 412 = AoO_2/AoU_2 \qquad \text{(Equation 2)}$$

In the Equation 2, "$AoO_2$" refers to an area of an intersection of the bounding rectangle 602 of the vehicle 412, which is inferred by the inferring part 303, and the correct bounding rectangle 802. "$AoU_2$" refers to an area of a union of the bounding rectangle 602 of the vehicle 412, which is inferred by the inferring part 303, and the correct bounding rectangle 802.

On the other hand, Pr refers to a probability that the vehicle 411 (or 412) is included in the bounding rectangle 601 (or 602) of the vehicle 411 (or 412) inferred by the inferring part 303. It is possible to calculate a degree of confidence of the bounding rectangle 601 (or 602) of the vehicle 411 (or 412) inferred by the inferring part 303, by multiplying the IoU and Pr of the vehicles 411, 412.

(1-3) Specific Example of Processing of Error Calculating Part

Figure 9:
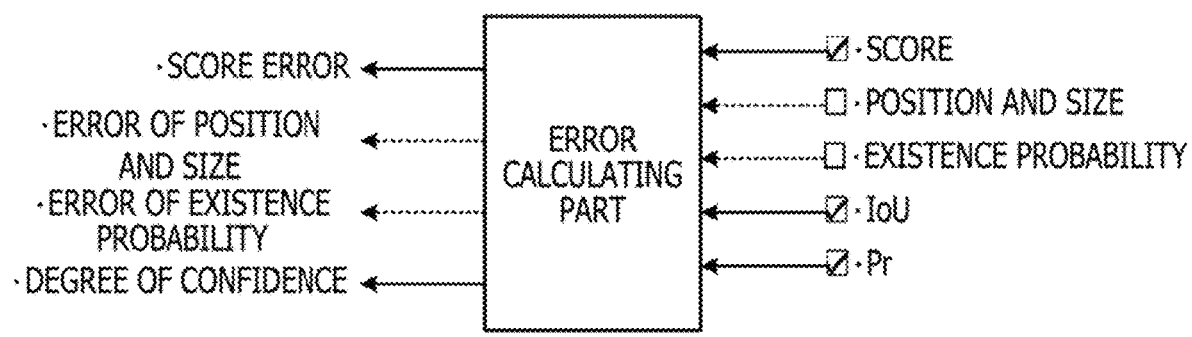
FIG. 9 illustrates a specific example of processing an error calculating part.

FIG. 9 illustrates a specific example of processing of the error calculating part. As illustrated in FIG. 9, it is possible to input to the error calculating part 304 information related to the score and the object (the position and the size, the existence probability, the IoU, and the Pr) that is calculated when the inferring part 303 infers the label as a result of the refine image being inputted.

As illustrated in FIG. 9, the error calculating part 304 calculates a score error and an object error, using information related to an input-table score or object. For example, the error calculating part 304 calculates the score error that is the error between the score when making inference using the generated refine image and the maximized correct label score. The error calculating part 304 calculates following items as the object error that is the error between the information related to the object when inferring the label using the generated refine image and the correct information related to the correct label object.

an error of the position and the size
an error of the existence probabilities(=(a difference between the existence probability of a region where the object exists and 1.0)+(a difference between the existence probability of a region where the object does not exist and 0.0))
a degree of confidence(=IoU×Pr)

The error calculating part 304 may preset an item to be used in calculation of the score error or the object error, of the score notified by the inferring part 303 and the information related to the object. The example of FIG. 9 illustrates that the error calculating part 304 notifies the score error and the degree of confidence to the image refiner part 301 because setting is such that the score, the IoU, and the Pr are inputted to the error calculating part 304.

(2) Specific Example of Processing of Map Generating Section

Next, a specific example of processing of the map generating section 142 is described.

(2-1) Overview of Processing of Components of Map Generating Section

Figure 10:
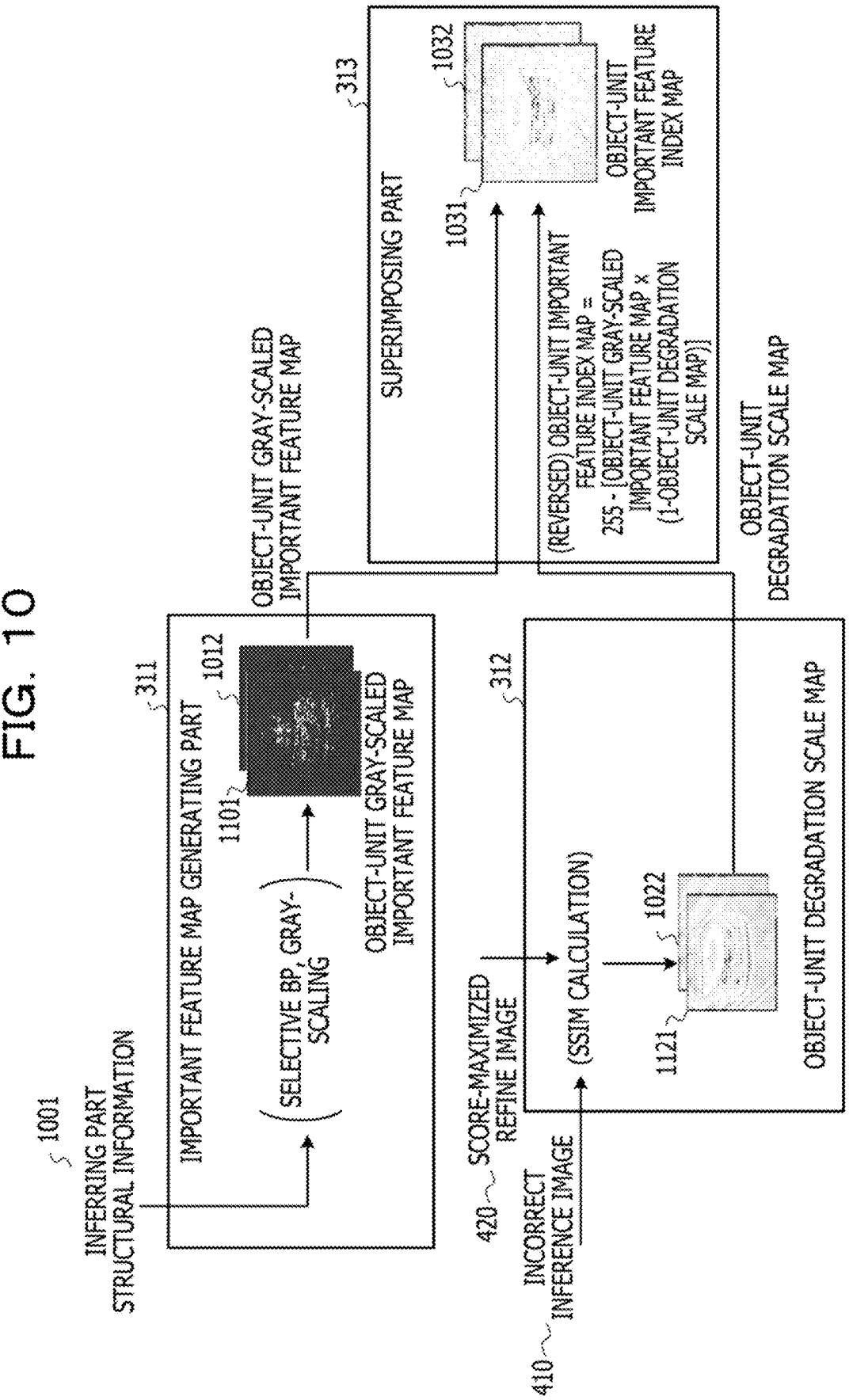
FIG. 10 illustrates an overview of processing of a map generating section.

First, description is given of an overview of processing of the components of the map generating section 142 (the important feature map generating part 311, the degradation scale map generating part 312, and the superimposing part 313). FIG. 10 illustrates the overview of the processing of the map generating section.

As illustrated in FIG. 10, in the map generating section 142, the important feature map generating part 311 acquires, from the inferring part 303, inferring part structural information 1001 at the time when the inferring part 303 inputs the score-maximized refine image to infer the label. The important feature map generating part 311 generates an important feature map based on the acquired inferring part structural information 1001, by using the selective BP method, for example.

The important feature map generating part 311 generates an important feature map for each object included in the score-maximized refine image. Because the score-maximized refine image 420 includes the two objects of the vehicle 411 and the vehicle 412, the important feature map generating part 311 generates two important feature maps using the selective BP method, for example (details of which are discussed below).

The important feature map generating part 311 gray-scales the two important feature maps generated for the two objects and generates object-unit gray-scaled important feature maps 1011, 1012.

The object-unit gray-scaled important feature maps 1011, 1012 illustrated in FIG. 10 are each gray-scaled with pixel values of 0 to 255. Hence, the object-unit gray-scaled important feature maps 1011, 1012, pixels having pixel values close to 255 are pixels with a high degree of attention (attention-drawing pixels) at the time of inference, and pixels having pixel values close to 0 are pixels with a low degree of attention (non-attention drawing pixels) at the time of the inference.

On the other hand, the degradation scale map generating part 312 reads the score-maximized refine image 420 from the refine image storing part 305 and performs the structural similarity (SSIM) calculation between the score-maximized refine image 420 and the incorrect inference image 410, for each object.

Because the score-maximized refine image 420 includes the two objects of the vehicle 411 and the vehicle 412, the degradation scale map generating part 312 generates two object-unit degradation scale maps 1021, 1022. The object-unit degradation scale maps 1021, 1022 take values from 0 to 1, and indicate that the closer to 1 the pixel value is, the smaller the degree of change is, while the closer to 0 the pixel value is, the larger the degree of change is.

The superimposing part 313 acquires the object-unit gray-scaled important feature maps 1011, 1012 generated by the important feature map generating part 311 and the object-unit degradation scale maps 1021, 1022 generated by the degradation scale map generating part 312. The superimposing part 313 generates object-unit important feature index maps 1031, 1032.

For example, the superimposing part 313 generates the object-unit important feature index maps 1031, 1032 based on the following equation:

Object-unit important feature index map=object-unit gray-scaled important feature map×(1-object-unit degradation scale map)   (Equation 3)

In the above equation, the term (1-object-unit degradation scale map) takes a value from 0 to 1. The degree of change is larger as the value is closer to 1, and is smaller as the value is closer to 0. For example, the object-unit important feature index maps 1031, 1032 are generated by adding intensity of the degree of change to the object-unit gray-scaled important feature map that indicates the degree of attention of each pixel that draws attention at the time of inference.

For example, the object-unit important feature index map 1031, 1032 are generated by • reducing the pixel values of the object-unit gray-scaled important feature map for portions where the degree of change is small in the object-unit degradation scale map 1021, 1022 and • increasing the pixel values of the object-unit gray-scaled important feature maps for portions where the degree of change is large in the object-unit degradation scale maps 1021, 1022.

To facilitate visualization, the object-unit important feature index map may be inverted. The object-unit important feature index map illustrated in FIG. 10 is inverted based on the following equation:

(inverted) Object-unit important feature index map=255−[object-unit gray-scaled important feature map×(1-object-unit degradation scale map)]   (Equation 4)

The advantages of the superimposing part 313 superimposing the object-unit gray-scaled important feature maps 1011, 1012 and the object-unit degradation scale maps 1021, 1022 based on the above equation are described.

As described above, the object-unit gray-scaled important feature maps 1011, 1012 generated by the important feature map generating part 311 are nothing less than attention portions that draw attention of the inferring part 303 when the correct label score is maximized.

On the other hand, the object-unit degradation scale maps 1021, 1022 generated by the degradation scale map generating part 312 each represent a changed portion when an incorrect inference image is changed such that the correct label score is maximized, and each represent a region that causes incorrect inference. Nevertheless, the object-unit degradation scale maps 1021, 1022 generated by the degradation scale map generating part 312 are not minimum portions for inferring the correct label.

The superimposing part 313 visualizes the minimum portions for inferring the correct label as an important portion for inferring a correct label, by superimposing the changed portions when the incorrect inference image is changed such that the correct label score is maximized and the attention portions that draw attention of the inferring part 303.

The example of FIG. 10 illustrates a case where the image refiner part 301 generates the score-maximized refine image with the second generation method. As illustrated in FIG. 10, in the case of the second generation method, the degradation scale map is generated for each object. Thus, superimposing the degradation scale map to the corresponding object-unit gray-scaled important feature map generates the object-unit important feature index map.

On the other hand, when the image refiner part 301 generates the score-maximized refine image with the first generation method, the degradation scale map generating part 312 generates a degradation scale map that includes all objects and has a size of 1. In this case, using the degradation scale map of 1 in common, the superimposing part 313 superimposes the object-unit gray-scaled important feature map of each of the objects. As such, the object-unit important feature index map is generated for each object.

(2-2) Details of Method of Generating Important Feature Map Using Selective BP Method Next, a generation method of the important feature map generating part 311 generating an important feature map for each object by means of the selective BP method is described in detail. As described above, the important feature map generating part 311 generates an important feature map for each object included in the score-maximized refine image.

Figure 11A:
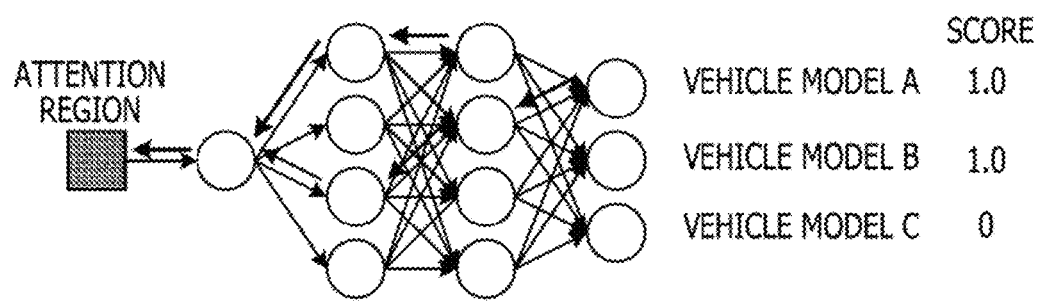
FIGS. 11A and 11B illustrate an example of a method of generating an important feature map using a selective BP method.
Figure 11B:
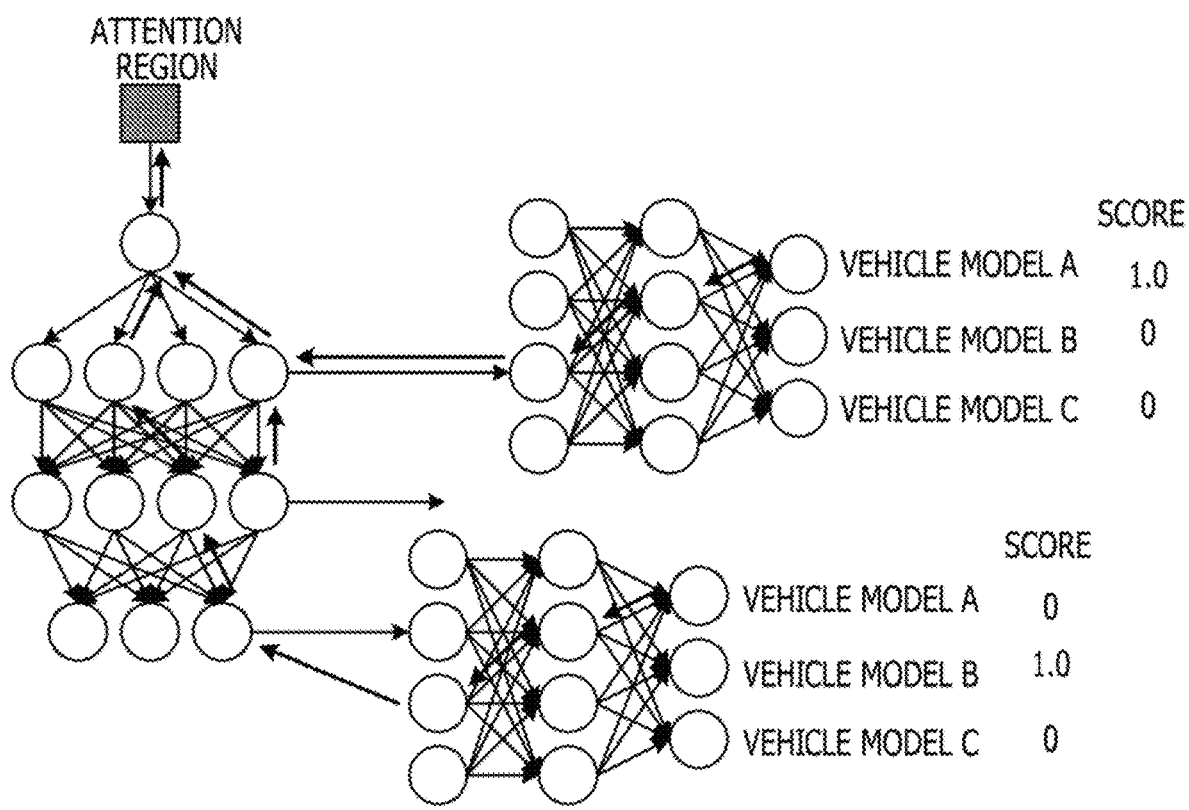

FIG. 11 (i.e., FIGS. 11A and 11B) illustrates an example of the method of generating the important feature map using the selective BP method. Of these, FIG. 11A illustrates a case where the important feature map is generated for all of the objects included in the score-maximized refine image 420.

As described above, the score-maximized refine image 420 includes the two objects (the vehicles 411, 412) that are of different vehicle models to each other. Consequently, simultaneously using the selective BP method on the two objects generates an important feature map in which pieces of information on attention regions of the two objects are mutually mixed.

On the other hand, FIG. 11B illustrates a case where the important feature map is generated separately for the two objects included in the score-maximized refine image 420. As illustrated in FIG. 11B, using the selective BP method separately on the two objects makes it possible to generate an important feature map in which pieces of information on the attention regions of the two objects are not mixed.

As such, the important feature map generating part 311 separately generates an important feature map for each object included in the score-maximized refine image. As a result, the important feature map generating part 311 makes it possible to generate an appropriate important feature map even when the score-maximized refine image includes a plurality of objects.

(3) Specific Example of Processing of Specifying Section

Specific examples of processing of the components of the specifying section 143 (the superpixel segmenting part 321 and the important superpixel determining part 322) are described.

(3-1) Specific Example of Processing of Superpixel Segmenting Part

Figure 12:
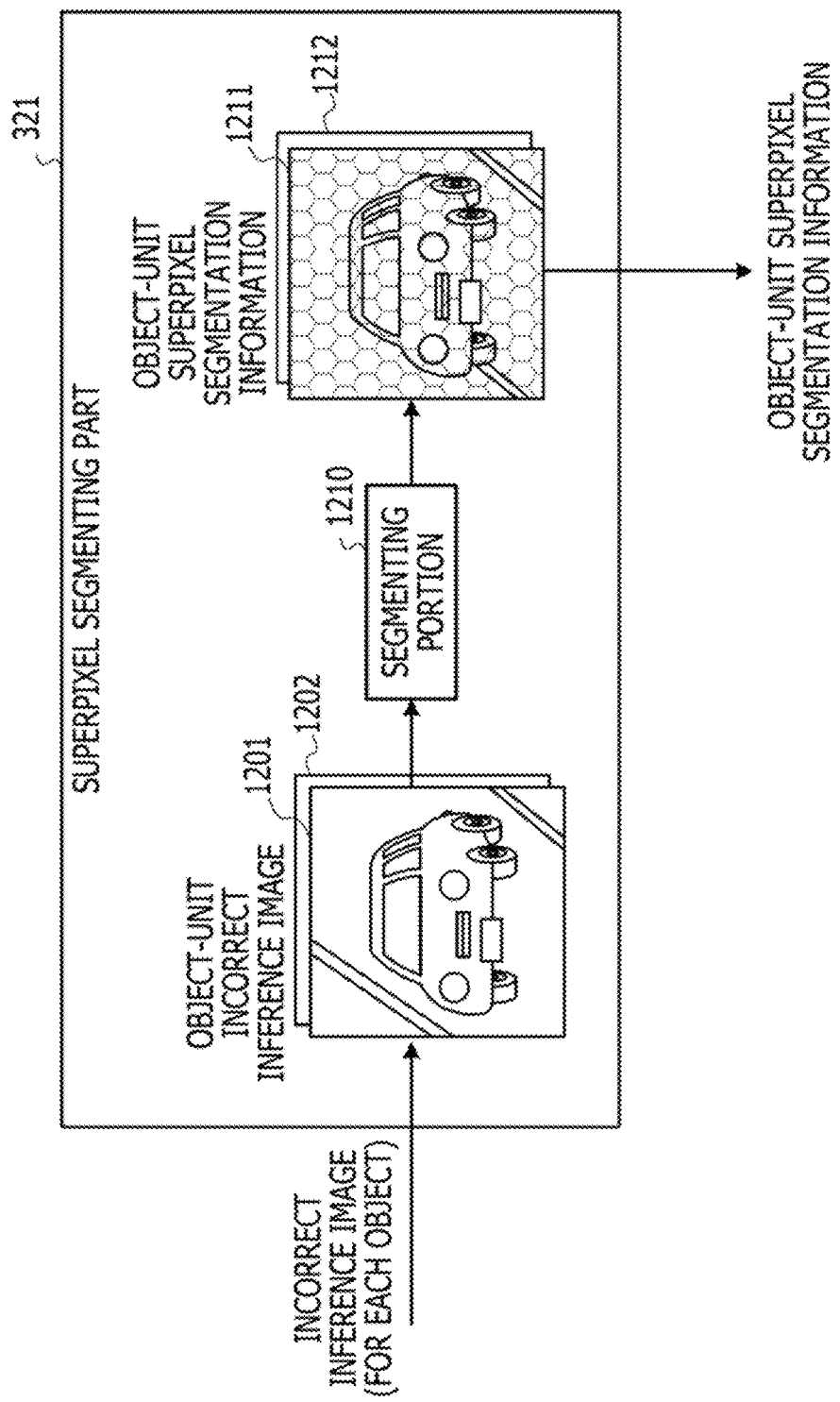
FIG. 12 illustrates a specific example of processing of a superpixel segmenting part.

First, a specific example of the processing of the superpixel segmenting part 321 included in the specifying section 143 is described. FIG. 12 illustrates the specific example of the processing of the superpixel segmenting part. As illustrated in FIG. 12, the superpixel segmenting part 321 includes a segmenting portion 1210 that performs a simple linear iterative clustering (SLIC) process, for example.

The segmenting portion 1210 acquires an incorrect inference image 511 for each object, and segments objects included in respective object-unit incorrect inference images 1201, 1202 into superpixels, the superpixels being a region for each element object. The superpixel segmenting part 321 outputs object-unit superpixel segmentation information 1211, 1212 generated by the segmentation into the superpixels by the segmenting portion 1210.

The example of FIG. 12 illustrates a case where the image refiner part 301 generates the score-maximized refine image with the second generation method. In the case of the second generation method, the object-unit important feature index maps the number of which corresponds to the number of objects are generated. Thus, the superpixel segmenting part 321 generates the object-unit superpixel segmentation information corresponding to the number of the objects.

On the other hand, when the image refiner part 301 generates the score-maximized refine image with the first generation method, the superpixel segmenting part 321 generates the superpixel segmentation information that includes all the objects and has the size of 1.

(3-2) Specific Example of Processing of Important Superpixel Determining Part

Figure 13:
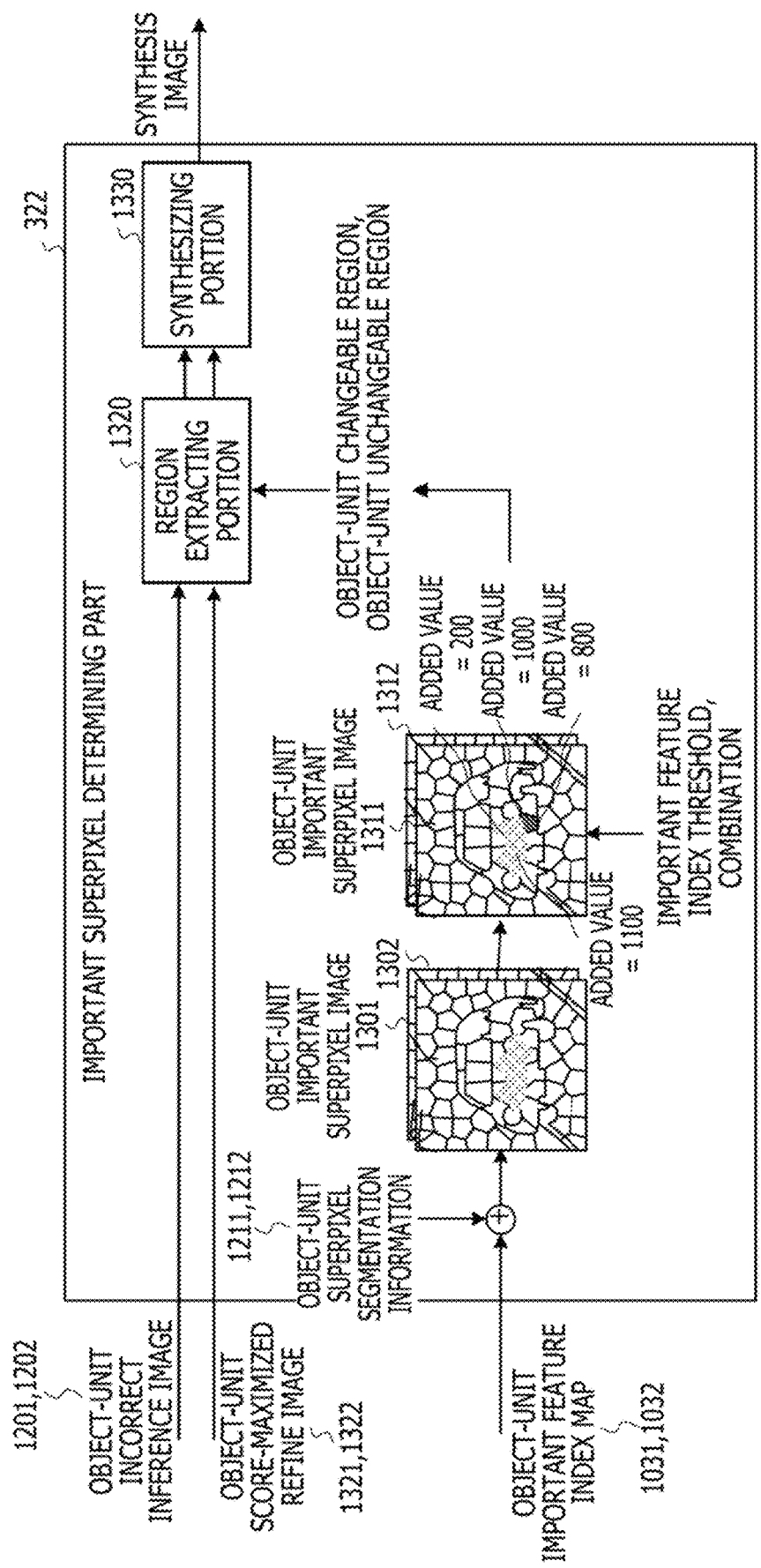
FIG. 13 illustrates a specific example of processing of an important superpixel determining part.

Next, a specific example of the processing of the important superpixel determining part 322 included in the specifying section 143 is described. FIG. 13 illustrates the specific example of the processing of the important superpixel determining part.

As illustrated in FIG. 13, the important superpixel determining part 322 includes a region extracting portion 1320 and a synthesizing portion 1330.

The important superpixel determining part 322 superimposes the object-unit important feature index maps 1031, 1032 outputted from the superimposing part 313 and the object-unit superpixel segmentation information 1211, 1212 outputted from the superpixel segmenting part 321. As such, the important superpixel determining part 322 generates object-unit important superpixel images 1301, 1302. FIG. 13 illustrates a case where an (inverted) important feature index map is used as the object-unit important feature index maps 1031, 1032.

The important superpixel determining part 322 adds up a pixel value of each pixel of the object-unit important feature index map 1031 for each superpixel in the generated object-unit important superpixel image 1301. The important superpixel determining part 322 similarly adds up a pixel value of each pixel of the object-unit important feature index map 1032 for each superpixel in the generated object-unit important superpixel image 1302. In FIG. 13, object-unit important superpixel images 1311, 1312 clearly illustrate an example of the added value for each superpixel for each of the objects.

The important superpixel determining part 322 determines whether the added value for each superpixel is larger than or equal to the important feature index threshold, and extracts superpixels for which the added value is determined to be larger than or equal to the important feature index threshold.

The important superpixel determining part 322 defines, as an object-unit changeable region, a superpixel group of combined superpixels selected from the extracted superpixels. A shaded area included in the object-unit important superpixel image 1311 of FIG. 13 represents an example of the changeable region. The important superpixel determining part 322 defines a group of superpixels other than the group of the combined superpixels as an object-unit unchangeable region.

The important superpixel determining part 322 notifies the region extracting portion 1320 for each object of the defined object-unit changeable region and object-unit unchangeable region.

The region extracting portion 1320 extracts image sections corresponding to the object-unit unchangeable regions from the object-unit incorrect inference images 1201, 1202. The region extracting portion 1320 extracts image sections corresponding to the object-unit changeable regions from the object-unit score-maximized refine images 1321, 1322.

The synthesizing portion 1330 synthesizes the image section corresponding to the object-unit changeable region extracted from the object-unit score-maximized refine image 1321 and the image section corresponding to the object-unit unchangeable region extracted from the object-unit incorrect inference image 1201, and generates an object-unit partial synthesis image.

The synthesizing portion 1330 similarly synthesizes the image section corresponding to the object-unit changeable region extracted from the object-unit score-maximized refine image 1322 and the image section corresponding to the object-unit unchangeable region extracted from the object-unit incorrect inference image 1202, and generates an object-unit partial synthesis image.

The synthesizing portion 1330 generates a synthesis image by uniting object-unit partial synthesis images the number of which corresponds to the number of objects.

Figure 14:
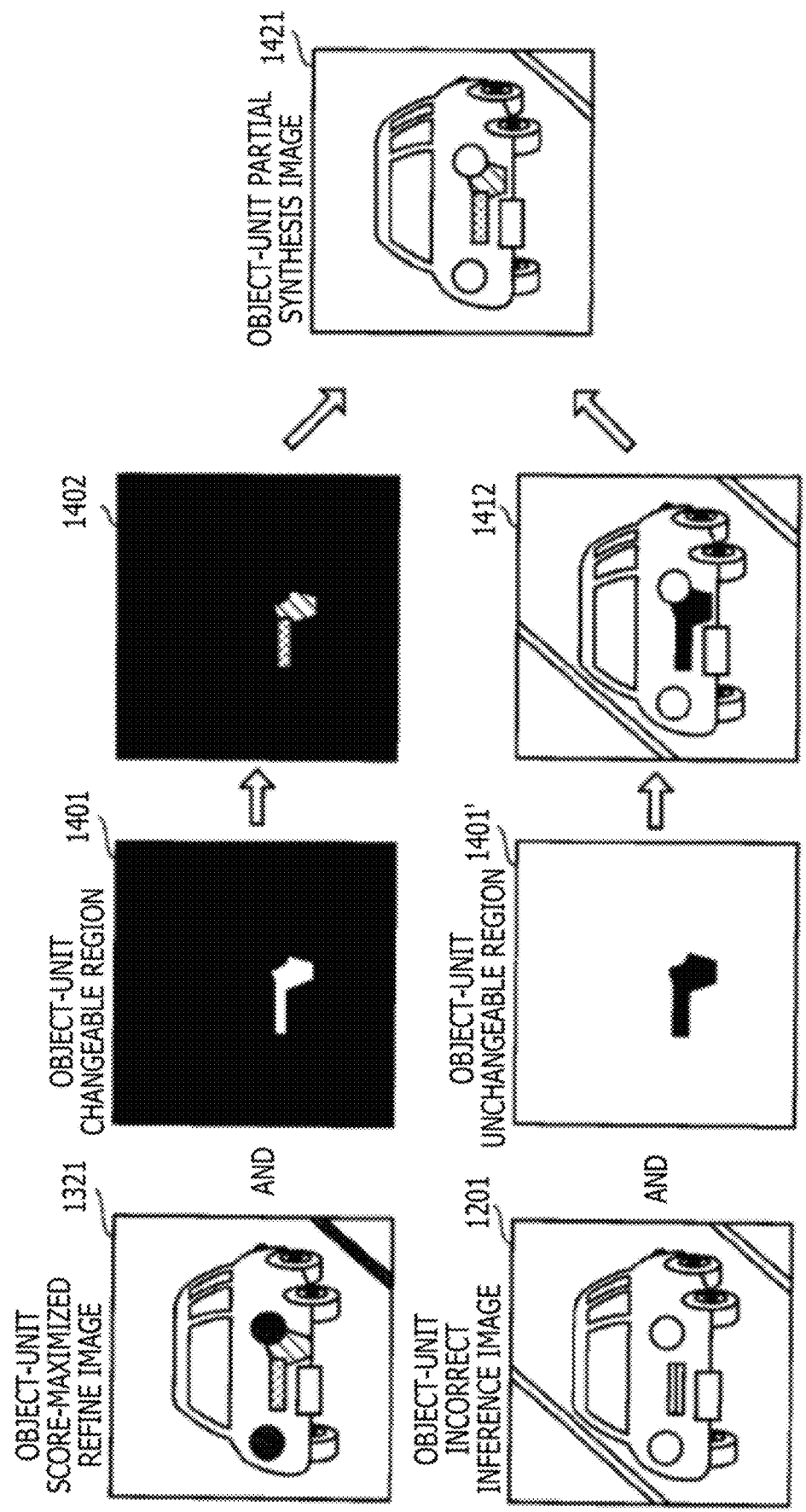
FIG. 14 illustrates a specific example of processing of region extracting portion and a synthesizing portion.

FIG. 14 illustrates a specific example of processing of the region extracting portion and the synthesizing portion. For simplicity of description, FIG. 14 illustrates specific examples of the processing of the region extracting portion and the synthesizing portion for the predetermined one object (here, the vehicle 411).

In FIG. 14, the upper column illustrates a case where the region extracting portion 1320 extracts an image of the object-unit changeable region 1401 (a white portion) from the object-unit score-maximized refine image 1321.

On the other hand, in FIG. 14, the lower column illustrates a case where the region extracting portion 1320 extracts an image of the object-unit unchangeable region 1401' (a white portion) from the object-unit incorrect inference image 1201. In FIG. 14, in the object-unit unchangeable region 1401', the white portion and the black portion of the object-unit changeable region 1401 are inverted (for the sake of explanation, in the lower stage of FIG. 14, the white portion represents the unchangeable region).

As illustrated in FIG. 14, the synthesizing portion 1330 synthesizes the image section of the object-unit changeable region 1401 of the object-unit score-maximized refine image 1321 and the image section of the object-unit unchangeable region 1401' of the object-unit incorrect inference image 1201, and generates an object-unit partial synthesis image 1421.

In this manner, the specifying section 143 makes it possible to specify a region to be replaced with an object-unit score-maximized refine image, of the object-unit incorrect inference images, in the unit of a superpixel.

The examples of FIG. 13 and FIG. 14 illustrate a case where the image refiner part 301 generates the score-maximized refine image with the second generation method. As illustrated in FIG. 13, in the case of the second generation method, object-unit superpixel segmentation information and an object-unit feature index map, which correspond to a size of each object, are generated. Therefore, an object-unit important superpixel image having the size of each object is generated.

As a result, the pixel value of the object-unit important feature index map is added for each object, using the object-unit important superpixel image. The changeable region and unchangeable region are defined for each object, using the object-unit important superpixel image. Uniting the object-unit partial synthesis images having the size of each object generates the synthesis image that includes all the objects and has the size of 1.

On the other hand, when the image refiner part 301 generates the score-maximized refine image with the first generation method, the superpixel segmentation information that includes all the objects and has the size of 1 is generated. Therefore, the important superpixel determining part 322 superimposes each of the object-unit important feature index maps having the size of each object to one piece of the superpixel segmentation information. This generates the object-unit important superpixel images having the size that includes all the objects, for the number of the objects.

As a result, the pixel value of the object-unit important feature index map is added for each object, using the object-unit important superpixel image having the size that includes all the objects. The changeable region and unchangeable region are defined for each object, using the object-unit important superpixel image having the size that includes all the objects.

When the changeable regions and the unchangeable regions are defined using the object-unit important superpixel image having the size that includes all the objects, it is possible for the synthesizing portion 1330 to generate one synthesis image that unites an object-unit partial synthesis image having the size that includes all the objects and the object-unit partial synthesis image having the size that includes all the objects.

Therefore, the important superpixel evaluating part 323 may acquire a correct label score that is inferred by input to the inferring part 303 of the object-unit partial synthesis image that has the size including all the objects, and may output the incorrect inference cause information for each object. Alternatively, the important superpixel evaluating part 323 may acquire the correct label score that is inferred by the inferring part 303 inputting the one synthesis image, and may output the incorrect inference cause information for all the objects.

<Flow of Incorrect Inference Cause Extracting Process>

Figure 15:
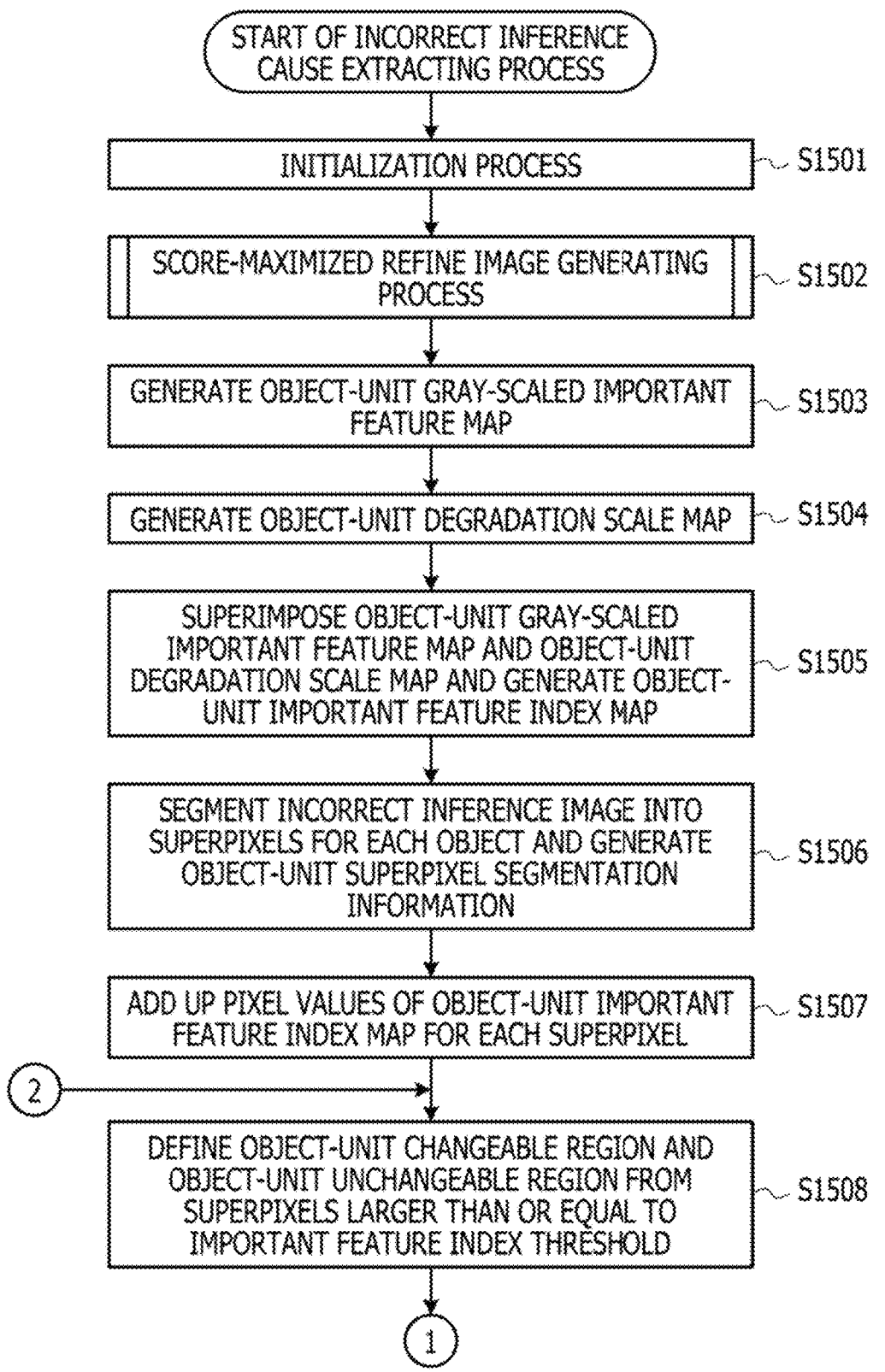
FIG. 15 is a first flowchart illustrating flow of an incorrect inference cause extracting process.
Figure 16:
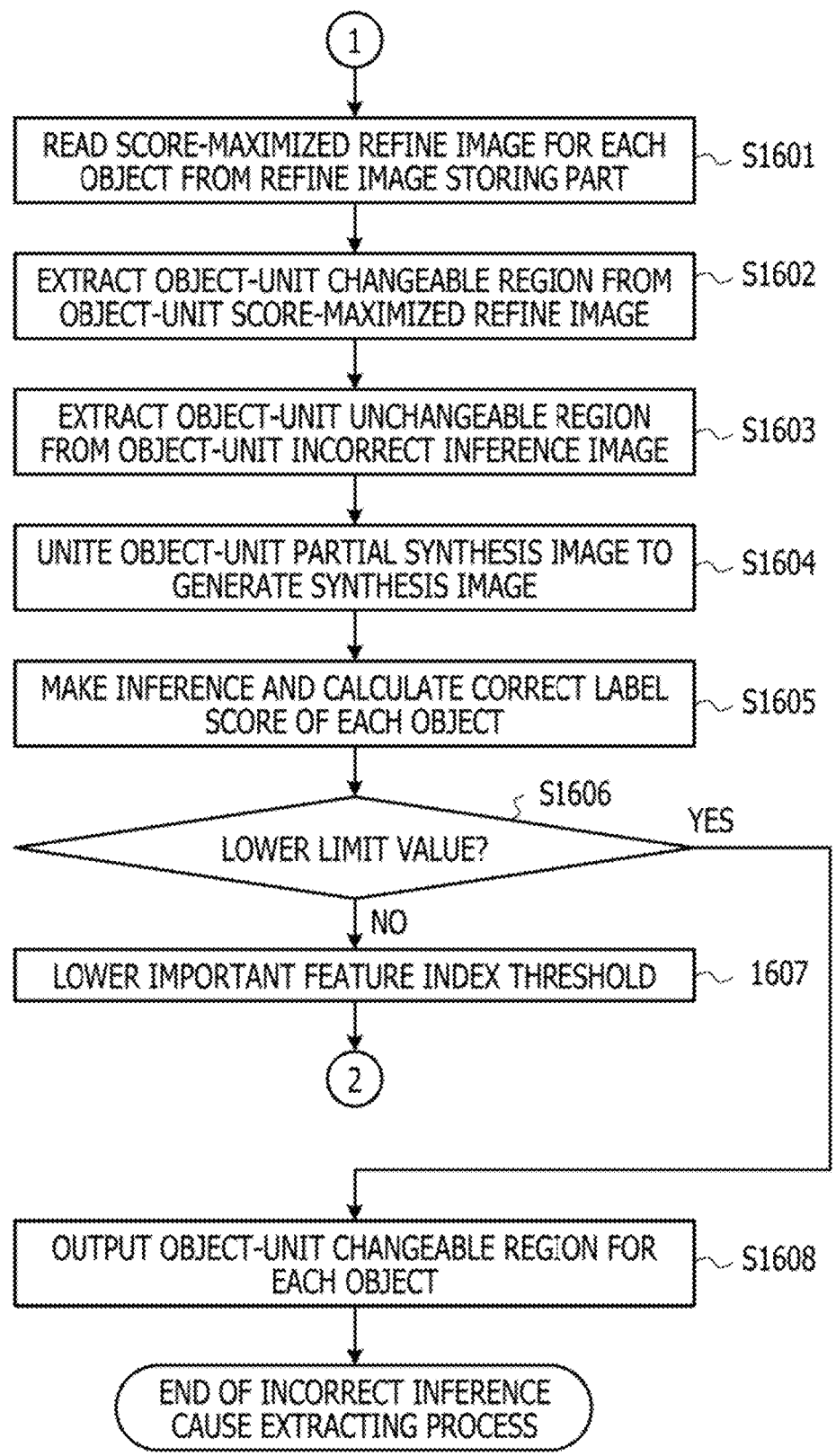
FIG. 16 is a second flowchart illustrating the flow of the incorrect inference cause extracting process.

Next, flow of an incorrect inference cause extracting process performed by the incorrect inference cause extracting unit 140 is described. FIG. 15 and FIG. 16 are first and second flowcharts illustrating the flow of the incorrect inference cause extracting process.

In step S1501, the components of the incorrect inference cause extracting unit 140 performs an initialization process. For example, the image refiner part 301 sets the number of training iterations for the CNN to zero and sets the maximum number of training iterations to a value instructed by the user. The image refiner part 301 sets a mode (any of a mode of maximizing a score targeted for all objects or a mode of maximizing a score targeted for an individual object) in generating a score-maximized refine image. The error calculating part 304 sets information used to calculate the object error, of the information related to the object. The important superpixel determining part 322 sets the important feature index threshold and a lower limit value thereof to values instructed by the user.

In step S1502, the image refiner part 301 performs a score-maximized refine image generating process. The scare-maximized refine image generating process is described below in detail.

In step S1503, the important feature map generating part 311 acquires, for each object, the inferring part structural information when the inferring part 303 inputs the score-maximized refine image and infers a label. The important feature map generating part 311 generates an object-unit gray-scaled important feature map based on the acquired inferring part structural information.

In step S1504, the degradation scale map generating part 312 generates an object-unit degradation scale map based on the object-unit incorrect inference image and the object-unit score-maximized refine image.

In step S1505, the superimposing part 313 generates the object-unit important feature index map, based on the object-unit gray-scaled important feature map and the object-unit degradation scale map.

In step S1506, the superpixel segmenting part 321 segments the incorrect inference image into superpixels for each object, and generates the object-unit superpixel segmentation information.

In step S1507, the important superpixel determining part 322 adds up a pixel value of each pixel in the object-unit important feature index map, for each superpixel.

In step S1508, the important superpixel determining part 322 extracts superpixels whose added values are larger than or equal to the important feature index threshold, and combines the superpixels selected from the extracted superpixels to define object-unit changeable regions. The important superpixel determining part 322 defines the superpixels other than the group of the combined superpixels as object-unit unchangeable regions.

Subsequently, in step S1601 in FIG. 16, the important superpixel determining part 322 reads an object-unit score-maximized refine image from the refine image storing part 305.

In step S1602, the important superpixel determining part 322 extracts an image section corresponding to the object-unit changeable region from the object-unit score-maximized refine image.

In step S1603, the important superpixel determining part 322 extracts an image section corresponding to the object-unit unchangeable region from the object-unit incorrect inference image.

In step S1604, the important superpixel determining part 322 synthesizes the image section corresponding to the object-unit changeable region and the image section corresponding to the object-unit unchangeable region, and generates object-unit partial synthesis images. The important superpixel determining part 322 unites the object-unit partial synthesis images to generate a synthesis image.

In step S1605, the inferring part 303 inputs the synthesis image to infer a label and calculates a correct label score of each object. The important superpixel evaluating part 323 acquires the correct label score calculated by the inferring part 303.

In step S1606, the important superpixel determining part 322 determines whether the important feature index threshold has reached the lower limit value. In step S1606, when the important superpixel determining part 322 determines that the important feature index threshold has not reached the lower limit value yet (No in step S1606), the process proceeds to step S1607.

In step S1607, the important superpixel determining part 322 lowers the important feature index threshold. Then, the process returns to step S1508 in FIG. 15.

On the other hand, in step S1606, when the important superpixel determining part 322 determines that the important feature index threshold has reached the lower limit value (Yes in step S1606), the process proceeds to step S1608.

In step S1608, the important superpixel evaluating part 323 specifies a combination of superpixels (object-unit changeable region) that causes incorrect inference based on the acquired correct label score of each object, and outputs the specified combination as the incorrect inference cause information.

<Details of Score-Maximized Refine Image Generating Process>

Figure 17:
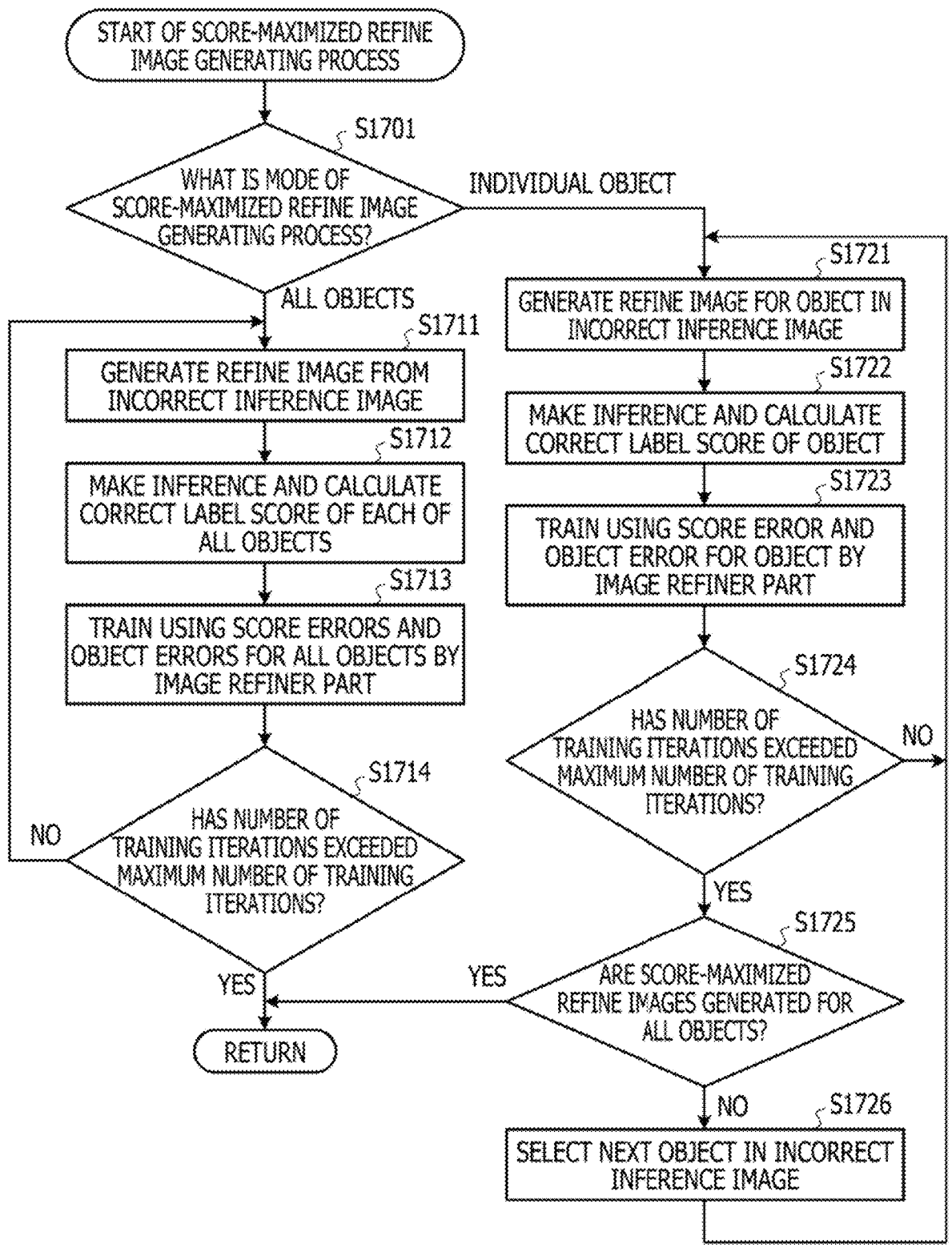
FIG. 17 is a flowchart illustrating flow of a score-maximized refine image generating process.

Next, the score-maximized refine image generating process (step S1502) of the incorrect inference cause extracting process (FIG. 15) is described in detail. FIG. 17 is a flowchart illustrating flow of the score-maximized refine image generating process.

In step S1701, the image refiner part 301 determines the mode of the score-maximized refine image generating process. In step S1701, when the image refiner part 301 determines that the mode of maximizing a score targeted for all objects is set, the process proceeds to step S1711.

In step S1711, the image refiner part 301 generates a refine image from the incorrect inference image and generates the refine image in the refine image storing part 305.

In step S1712, the inferring part 303 inputs the refine image to infer a label and calculates correct label scores of all objects.

In step S1713, the image refiner part 301 performs the CNN learning process (i.e., the CNN training process), using score errors and object errors for all the objects that are calculated by the error calculating part 304, and the image difference value calculated by the image error calculating part 302.

In step S1714, the image refiner part 301 determines whether the number of training iterations exceeds the maximum number of training iterations. In step S1714, when the image refiner part 301 determines that the number of training iterations does not exceed the maximum number of training iterations (No in step S1714), the process returns to step S1711 and the generation of the refine image continues.

On the other hand, in step S1714, when the image refiner part 301 determines that the number of training iterations exceeds the maximum number of training iterations (Yes in step S1714), the process proceeds to step S1503 of FIG. 15. At this time, one score-maximized refine image is stored in the refine image storing part 305.

On the other hand, in step S1701, when the image refiner part 301 determines that the mode of maximizing a score targeted for an individual object is set, the process proceeds to step S1721.

In step S1721, the image refiner part 301 generates a refine image for the predetermined one object in the incorrect inference image and stores the refine image in the refine image storing part 305.

In step S1722, the inferring part 303 inputs the refine image to infer a label and calculates a correct label score of the predetermined object.

In step S1723, the image refiner part 301 performs the CNN learning (i.e., the CNN training process), using score errors and object errors for the predetermined one objects that is calculated by the error calculating part 304, and the image difference value calculated by the image error calculating part 302.

In step S1724, the image refiner part 301 determines whether the number of training iterations exceeds the maximum number of training iterations. In step S1724, when the image refiner part 301 determines that the number of training iterations does not exceed the maximum number of training iterations (No in step S1724), the process returns to step S1721 and the generation of the refine image continues.

On the other hand, in step S1724, when the image refiner part 301 determines that the number of training iterations exceeds the maximum number of training iterations (Yes in step S1724), the process proceeds to step S1725. At this time, the score-maximized refine image for the predetermined one object is stored in the refine image storing part 305.

In step S1725, the image refiner part 301 determines whether the score-maximized refine images are generated for ail the objects included in the incorrect inference image.

In step S1725, when the image refiner part 301 determines that there is an object for which the score-maximized refine image has not been generated yet (No in step S1725), the process returns to step S1726.

In step S1726, the image refiner part 301 selects, as a predetermined one object, a next object for which the score-maximized refine image is to be generated. Then, the process returns to step S1721.

On the other hand, in step S1725, when the image refiner part 301 determines that the score-maximized refine images have been generated for all the objects (Yes in step S1725), the process returns to step S1503 in FIG. 15. At this time, the score-maximized refine images the number of which corresponds to the number of objects are stored in the refine image storing part 305.

Specific Example of Incorrect Inference Cause Extracting Process

Figure 18:
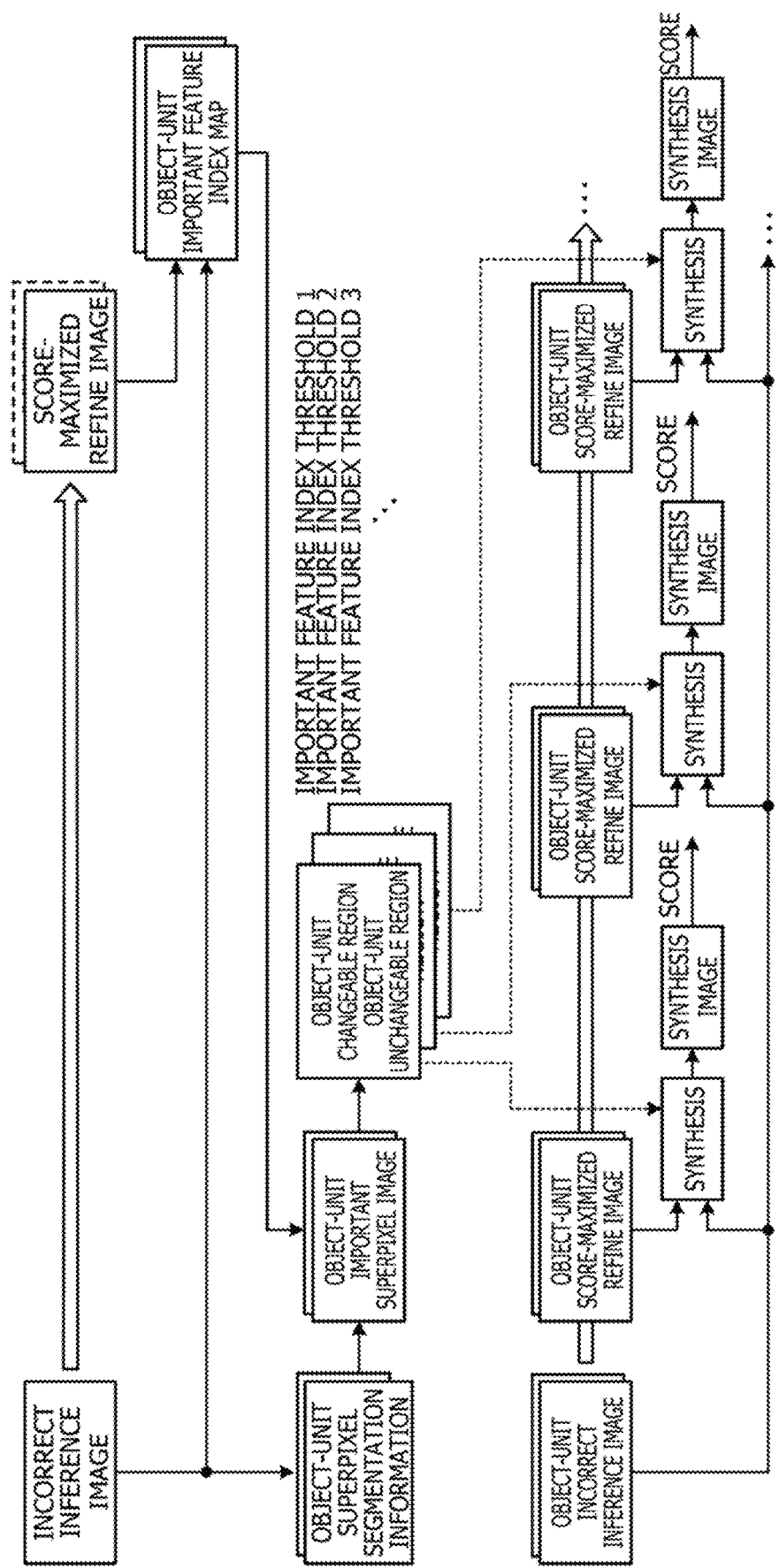
FIG. 18 illustrates a specific example of the incorrect inference cause extracting process.

Next, a specific example of the incorrect inference cause extracting process is described. FIG. 18 is a diagram illustrating the specific example of the incorrect inference cause extracting process.

As illustrated in FIG. 18, first, when the refine image generating section 141 generates a score-maximized refine image from an incorrect inference image, the map generating section 142 generates an object-unit important feature index map.

Subsequently, when the incorrect inference image is read in the unit of an object, the superpixel segmenting part 321 generates the object-unit superpixel segmentation information.

Subsequently, the important superpixel determining part 322 adds up the pixel value of the object-unit important feature index map for each superpixel that is segmented based on the object-unit superpixel segmentation information, and generates an object-unit important superpixel image.

Subsequently, the important superpixel determining part 322 defines changeable object-unit changeable region and object-unit unchangeable region in the object-unit important superpixel image based on the important feature index threshold. The important superpixel determining part 322 changes the important feature index threshold and changes a combination of superpixels selected from superpixels that exceed the important feature index threshold. As such, the important superpixel determining part 322 generates a plurality of sets of object-unit changeable regions and object-unit unchangeable regions. The important superpixel determining part 322 synthesizes the object-unit score-maximized refine image and the object-unit incorrect inference image, using each of the generated plurality of sets of object-unit changeable regions and object-unit unchangeable regions. The important superpixel determining part 322 generates a synthesis image by uniting the object-unit partial synthesis images.

Subsequently, the important superpixel evaluating part 323 inputs the generated synthesis image and acquires the correct label score inferred by the inferring part 303. As such, the important superpixel evaluating part 323 specifies a combination of superpixels (object-unit changeable regions) that causes incorrect inference based on the acquired correct label scores and outputs the specified combination as the incorrect inference cause information.

As is clear from the above description, the analysis apparatus 100 according to the first embodiment generates the score-maximized refine image having the maximized correct label score of inference, from the incorrect inference image by which an incorrect label is inferred in the image recognition process.

The analysis apparatus 100 according to the first embodiment generates an important feature index map that indicates the degree of importance for each pixel for inferring a correct label.

The analysis apparatus 100 according to the first embodiment defines the changeable region based on the pixel value of the important feature index map and replaces the defined changeable region with a score-maximized refine image.

The analysis apparatus 100 according to the first embodiment specifies the image section that causes incorrect inference, while referring to the effect of replacement.

As such, according to the first embodiment, it is possible to improve the precision at the time of specifying an image section that causes incorrect inference.

The analysis apparatus 100 according to the first embodiment uses the information (the position and the size, the existence probability, the IoU, and the Pr) related to the object included in the incorrect inference image, and generates the score-maximized refine image from the incorrect inference image. As such, according to the first embodiment, it is possible to appropriately generate the score-maximized refine image.

When the score-maximized refine image includes a plurality of objects, the analysis apparatus 100 according to the first embodiment generates the important feature index map for each object. As such, according to the first embodiment, it is possible to appropriately generate an important feature index map even when the score-maximized refine image includes the plurality of objects.

Second Embodiment

In the above-described first embodiment, description is given of a case where the incorrect inference image includes the two objects. However, obviously, the embodiment is applicable to a case where the incorrect inference image includes one object. Obviously, the embodiment is applicable to a case where the incorrect inference image includes three or more objects.

In the above-described first embodiment, description is given of a case where both of the two objects included in the incorrect inference image are the vehicles. However, the two objects included in the incorrect inference image are not limited to the vehicles and may be any object other than the vehicles.

In the above-described first embodiment, description is given on the assumption that the important feature index threshold is uniformly set for the object-unit important superpixel images 1311, 1312. However, a different important feature index threshold may be set for each of the object-unit important superpixel mage 1311 and the object-unit important superpixel image 1312. In the above-described first embodiment, description is given on the assumption that when the important feature index threshold is lowered, a degree of reduction is made uniform in the object-unit important superpixel image 1311 and the object-unit important superpixel image 1312. However, the degree of reduction of the important feature index threshold may be changed in the object-unit important superpixel image 1311 and the object-unit important superpixel image 1312.

The present invention is not limited to the configurations illustrated herein while the configurations exemplified according to the aforementioned embodiments may also be combined with other elements, for example. These aspects may be changed without departing from the gist of the present invention and appropriately set in accordance with applied modes thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An analysis apparatus comprising:
a memory configured to program instructions; and
processor circuitry coupled to the memory, the processor circuitry being configured to perform processing, the processing including:
generating a refine image having a maximized correct label score of inference from an incorrect inference image from which an incorrect label is inferred by a neural network;
generating a third map by superimposing a first map and a second map, the first map indicating pixels to each of which a change is made in generating the refine image, of a plurality of pixels of the incorrect inference image, the second map indicating a degree of attention for each local region in the refine image, the each local region being a region that has drawn attention at the time of inference by the neural network, and the third map indicating a degree of importance for each pixel for inferring a correct label; and
specifying an image section based on a pixel value of the third map, the image section corresponding to a region causing incorrect inference in the incorrect inference image,
the generating of the refine image is configured to generate the refine image from the incorrect inference image by using information that is calculated at the time of inference and is related to an inference target included in the incorrect inference image.

2. The analysis apparatus according to claim 1, wherein the generating of the refine image is configured to calculate, as the information related to the inference target, any of a position and a size of the inference target, an existence probability of the inference target, an evaluation index that indicates whether it is possible to correctly detect the inference target, or a probability that the inference target is included in a bounding rectangle, in the incorrect inference image at the time of inference.

3. The analysis apparatus according to claim 1, wherein the generating of the refine image is configured to generates the refine image from the incorrect inference image by using an error between the information related to the inference target that is calculated at the time of inference and correct information related to the inference target included in the incorrect inference image.

4. The analysis apparatus according to claim 1, wherein the generating of the refine image is configured to, when the incorrect inference image includes a plurality of inference targets, generate one refine image for which scores of correct labels of the all inference targets at the time of inference is maximized.

5. The analysis apparatus according to claim 4 wherein the generating of the third map is configured to generate the third maps the number of which corresponds to the number of the inference targets, by generating the first map for each of the plurality of inference targets included in the one refine image.

6. The analysis apparatus according to claim 1, wherein the generating of the refine image is configured to generate, for each of a plurality of inference targets included in the incorrect inference image, the refine image for which scores of correct labels for respective inference target at the time of inference is maximized.

7. The analysis apparatus according to claim 6, wherein the generating of the third map is configured to
generate, for the respective inference target, the first map by using the generated refine image of the respective inference target, and
generate, for the respective inference target, the third map by using the first map of the respective inference target.

8. The analysis apparatus according to claim 1, wherein the generating of the refine image is configured to, when the incorrect inference image includes a plurality of inference targets, repeat, according to the number of inference targets, a process of maximizing a score of a correct label of inference of one inference target, to generate refine images the number of which corresponds to the number of the inference targets.

9. The analysis apparatus according to claim 6, wherein the generating of the third map is configured to generate the third maps the number of which corresponds to the number of the inference targets, by generating the first map and the second map for the refine image of each of the plurality of inference targets.

10. The analysis apparatus according to claim 5, wherein the specifying of the image section is configured to
define, for each of the plurality of the inference targets, based on pixel values of the third maps the number of which corresponds to the number of the inference targets, a first region of the incorrect inference image and a second region of the incorrect inference image, the first region being replaced with the refine image and the second region not being replaced with the refine image, and
generate a partial synthesis image for each of the plurality of inference targets by replacing the defined first region with the refine image.

11. The analysis apparatus according to claim 7, wherein the specifying of the image section is configured to
define, for each of the plurality of the inference targets, based on pixel values of the third maps the number of which corresponds to the number of the inference targets, a first region of the incorrect inference image and a second region of the incorrect inference image, the first region being replaced with the refine image and the second region not being replaced with the refine image, and
generate a partial synthesis image for each of the plurality of inference targets by replacing the defined first region with the refine image.

12. A non-transitory computer-readable storage medium for storing an analysis program which causes processor circuitry of a computer to perform processing, the processing comprising:
generating a refine image having a maximized correct label score of inference from an incorrect inference image from which an incorrect label is inferred by a neural network;
generating a third map by superimposing a first map and a second map, the first map indicating pixels to each of which a change is made in generating the refine image, of a plurality of pixels of the incorrect inference image, the second map indicating a degree of attention for each local region in the refine image, the each local region being a region that has drawn attention at the time of inference by the neural network, and the third map indicating a degree of importance for each pixel for inferring a correct label; and
specifying an image section based on a pixel value of the third map, the image section corresponding to a region causing incorrect inference in the incorrect inference image,
the generating of the refine image is configured to generate the refine image from the incorrect inference image by using information that is calculated at the time of inference and is related to an inference target included in the incorrect inference image.

13. An analysis method implemented by processor circuitry of a computer, the method comprising:
generating a refine image having a maximized correct label score of inference from an incorrect inference image from which an incorrect label is inferred by a neural network;
generating a third map by superimposing a first map and a second map, the first map indicating pixels to each of which a change is made in generating the refine image, of a plurality of pixels of the incorrect inference image, the second map indicating a degree of attention for each local region in the refine image, the each local region being a region that has drawn attention at the time of inference by the neural network, and the third map indicating a degree of importance for each pixel for inferring a correct label; and
specifying an image section based on a pixel value of the third map, the image section corresponding to a region causing incorrect inference in the incorrect inference image,
the generating of the refine image is configured to generate the refine image from the incorrect inference image by using information that is calculated at the time of inference and is related to an inference target included in the incorrect inference image.

\* \* \* \* \*